(12) United States Patent
Antonopoulos et al.

(10) Patent No.: US 11,213,074 B2
(45) Date of Patent: Jan. 4, 2022

(54) AEROSOL-GENERATING SYSTEM WITH ELECTRICAL CONNECTOR

(71) Applicant: Philip Morris Products S.A., Neuchatel (CH)

(72) Inventors: Roland Antonopoulos, Neuchatel (CH); Jean-Luc Fringeli, Singapore (SG)

(73) Assignee: Philip Morris Products S.A., Neuchatel (CH)

( * ) Notice: Subject to any disclaimer, the term of this patent is extended or adjusted under 35 U.S.C. 154(b) by 146 days.

(21) Appl. No.: 16/608,643

(22) PCT Filed: May 2, 2018

(86) PCT No.: PCT/EP2018/061231
§ 371 (c)(1),
(2) Date: Oct. 25, 2019

(87) PCT Pub. No.: WO2018/202730
PCT Pub. Date: Nov. 8, 2018

(65) Prior Publication Data
US 2021/0112879 A1    Apr. 22, 2021

(30) Foreign Application Priority Data

May 2, 2017 (EP) ..................................... 17169140

(51) Int. Cl.
*A24F 13/00*    (2006.01)
*A24F 40/90*    (2020.01)
(Continued)

(52) U.S. Cl.
CPC .............. *A24F 40/90* (2020.01); *A24F 40/40* (2020.01); *A24F 40/57* (2020.01);
(Continued)

(58) Field of Classification Search
CPC ...................................................... A24F 47/00
(Continued)

(56) References Cited

U.S. PATENT DOCUMENTS 7,293,565 B2 * 11/2007 Griffin .................... A24F 40/90
                                                                 131/329
9,877,521 B1 *  1/2018 Gillis ...................... A24F 40/42
(Continued)

FOREIGN PATENT DOCUMENTS

CN         2927408 Y    7/2007
KR   20-2009-0008713 U  8/2009
(Continued)

OTHER PUBLICATIONS

International Search Report and Written Opinion dated Aug. 20, 2018 in PCT/EP2018/061231 filed on May 2, 2018.
(Continued)

*Primary Examiner* — Phuong K Dinh
(74) *Attorney, Agent, or Firm* — Oblon, McClelland, Maier & Neustadt, L.L.P.

(57) ABSTRACT

An electrically operated aerosol-generating system is provided, including an aerosol-generating device having a first connector part; a charging unit to receive the device and having a second connector part. The first part includes first through third electrical contacts, the third at least partially circumscribes the first. The second part includes first through third electrical contacts, the second and the third being spaced radially outwardly from the first. The first and the second parts electrically engage when the device is received by the charging unit, such that the first contact of
(Continued)

the first and the second parts engage, the second contract of the first part engages the second or the third contact of the second part, and the third contact of the first part engages the other of the second or the third contact of the second part, regardless of angular position of the second part relative to the first.

15 Claims, 9 Drawing Sheets

(51) Int. Cl.
    *A24F 40/40*     (2020.01)
    *A24F 40/57*     (2020.01)
    *H01R 13/62*     (2006.01)
    *H01R 33/72*     (2006.01)
    *H01R 39/64*     (2006.01)
    *H02J 7/00*     (2006.01)

(52) U.S. Cl.
    CPC ......... *H01R 13/6205* (2013.01); *H01R 33/72* (2013.01); *H01R 39/64* (2013.01); *H02J 7/0045* (2013.01)

(58) Field of Classification Search
    USPC .................................................. 131/328–329
    See application file for complete search history.

(56) References Cited

U.S. PATENT DOCUMENTS

| | | | |
|---|---|---|---|
| 10,010,114 B2* | 7/2018 | Jordan | H02J 7/0044 |
| 11,031,798 B2* | 6/2021 | Sun | A24F 1/00 |
| 2014/0261495 A1 | 9/2014 | Novak, III et al. | |
| 2015/0020832 A1 | 1/2015 | Greim et al. | |
| 2015/0128971 A1 | 5/2015 | Verleur et al. | |
| 2015/0128972 A1 | 5/2015 | Verleur et al. | |
| 2015/0128976 A1 | 5/2015 | Verleur et al. | |
| 2017/0156404 A1 | 6/2017 | Novak, III et al. | |
| 2018/0248393 A1* | 8/2018 | Sun | A24F 1/00 |

FOREIGN PATENT DOCUMENTS

| | | |
|---|---|---|
| KR | 20-2011-0009632 U | 10/2011 |
| KR | 10-2014-0114554 A | 9/2014 |
| RU | 2 609 131 C2 | 1/2017 |
| TW | 202825 | 3/1993 |

OTHER PUBLICATIONS

Notification for the Opinion of Examination, dated May 28, 2021 in corresponding Taiwanese Patent Application No. 107114053 (with English translation) (6 pages), citing documents AO and AP therein.
Official Action dated Sep. 22, 2021 in corresponding Russian Patent Application No. 2019136700, citing AO, AP and AQ listed above (with English translation) (15 pages).

* cited by examiner

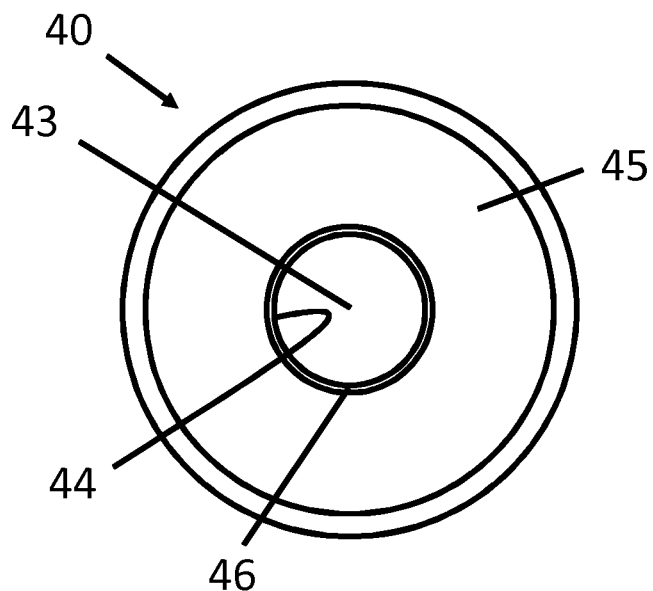
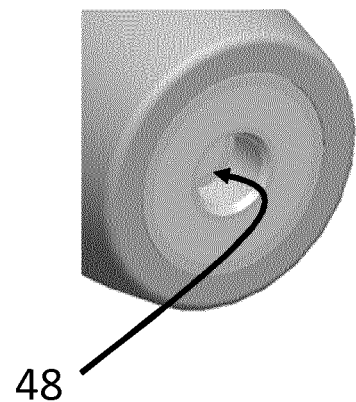
Figure 9
Figure 10
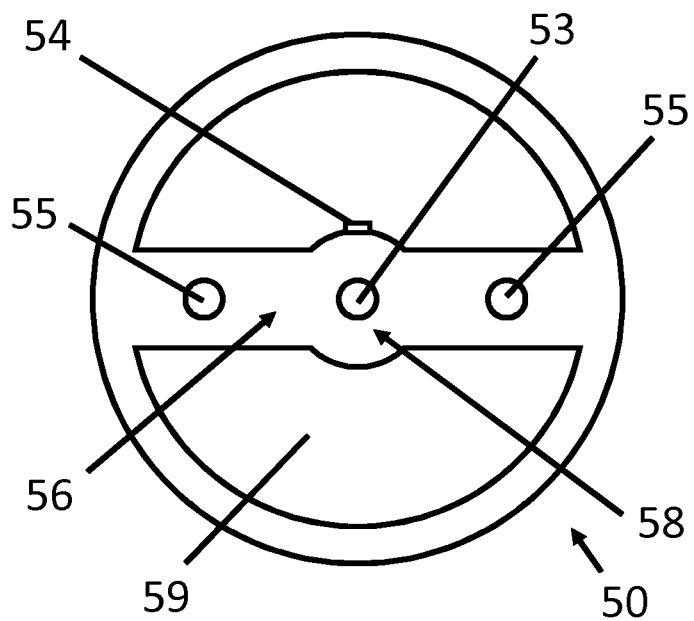
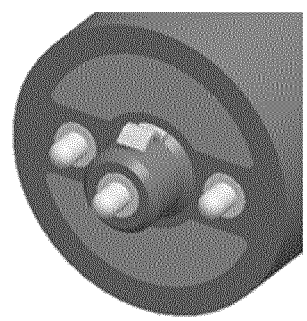
Figure 11
Figure 12

AEROSOL-GENERATING SYSTEM WITH ELECTRICAL CONNECTOR

BACKGROUND

The present invention relates to electrically operated aerosol-generating systems. In particular, the present invention relates to electrically operated aerosol-generating systems comprising an aerosol-generating device and a charging unit. The present invention also relates to electrical connectors for electrically operated aerosol-generating systems.

Electrically operated aerosol-generating systems generally comprise an aerosol-forming substrate and an atomiser, which is operated to atomise the aerosol-forming substrate to form an aerosol for inhalation by a user. Typically, electrically operated aerosol-generating systems also comprise an aerosol-generating device comprising an electrical power supply for supplying power to the atomiser. The atomiser may be an electric heater.

In some systems, the aerosol-generating device is configured to receive an aerosol-generating article comprising a solid aerosol-forming substrate, such as a gathered, crimped sheet of tobacco. In these systems, the device typically comprises the atomiser, which is arranged to heat the aerosol-forming substrate when the article is received in the device. The article may also comprise a filter, which is wrapped together with the aerosol-forming substrate in the form of a rod, similar to a conventional cigarette. In other systems, the device is configured to receive a cartridge comprising the atomiser and a liquid aerosol-forming substrate. Such cartridges are often referred to as cartomisers. Common types of atomiser used in cartomisers comprises a coil of heater wire wound around an elongate wick soaked in liquid aerosol-forming substrate.

Some electrically operated aerosol-generating systems include a charging unit for recharging the electrical power supply of the electrically operated aerosol-generating device. The charging unit may comprise a housing, a rechargeable electrical power supply housed in the housing and a cavity for receiving the electrically operated aerosol-generating device. Typically, charging units are portable and may be carried with the device by a user for extending the operating time of the device.

It would be desirable to improve the speed and ease with which a user is able to electrically connect an aerosol-generating device and a charging unit. It would also be desirable to provide an electrical connector for an electrically operated aerosol-generating system that enables electrical connection between an aerosol-generating device and a charging unit at any angular position. It would further be desirable to provide means to improve the electrical connection between an aerosol-generating device and a charging unit.

BRIEF SUMMARY

According to an aspect of the invention, there is provided an electrically operated aerosol-generating system comprising an aerosol-generating device, a charging unit configured to receive the aerosol-generating device and a first connector part and a second connector part. The aerosol-generating device has one of the first connector part and the second connector part and the charging unit has the other one of the first connector part and the second connector part. The first connector part comprises: a first electrical contact; a second electrical contact at least partially circumscribing the first electrical contact; and a third electrical contact at least partially circumscribing the first electrical contact. The second connector part comprises: a first electrical contact; a second electrical contact spaced radially outwardly from the first electrical contact; and a third electrical contact spaced radially outwardly from the first electrical contact. The first and second connector parts are arranged such that when the aerosol-generating device is received by the charging unit the first and second connector parts electrically engage. The electrical contacts of the first and second connector parts are arranged such that when the first and second connector parts electrically engage: the first electrical contact of the first connector part electrically engages the first electrical contact of the second connector part; the second electrical contact of the first connector part electrically engages one of the second electrical contact and the third electrical contact of the second connector part; and the third electrical contact of the first connector part electrically engages the other one of the second electrical contact and the third electrical contact of the second connector part, regardless of the angular position of the second connector part relative to the first connector part.

The first and second connector parts of the present invention enable electrical connection between an aerosol-generating device and a charging unit regardless of the angular position of the device relative to the charging unit. Advantageously, this may improve the speed and ease with which a user is able to electrically connect an aerosol-generating device and a charging unit. For example, this may enable a user to electrically connect a device and a charging unit when the device and charging unit are unsighted, such as in the dark or when the user's attention is focused elsewhere.

As used herein, the term 'aerosol-generating device' refers to a device that interacts with an aerosol-forming substrate to generate an aerosol that is directly inhalable into a user's lungs thorough the user's mouth. In certain embodiments, an aerosol-generating device may heat an aerosol-forming substrate to facilitate the release of the volatile compounds. An aerosol-generating device may interact with an aerosol-generating article comprising an aerosol-forming substrate or a cartridge comprising an aerosol-forming substrate. An electrically operated aerosol-generating device may comprise an atomiser, such as an electric heater, to heat the aerosol-forming substrate to form an aerosol.

As used herein, the term 'aerosol-generating article' refers to an article comprising an aerosol-forming substrate capable of releasing volatile compounds, which can form an aerosol. In certain embodiments, the aerosol-generating article may comprise an aerosol-forming substrate capable of releasing upon heating volatile compounds, which can form an aerosol.

As used herein 'electrical engagement' is used to describe an electrical connection or electrical contact between the first and second connector parts that enables an electric current to flow between the first and second connector parts.

As used herein 'angular position' is used to describe the relative rotational position or orientation of one component relative to another component about an axis.

As used herein, the terms 'upstream', 'downstream', 'proximal' and 'distal' are used to describe the relative positions of components, or portions of components, of aerosol-generating devices, aerosol-generating articles and charging units.

As used herein, the term 'longitudinal' is used to describe the direction between a downstream, proximal or mouth end and the opposed upstream or distal end and the term 'transverse' is used to describe the direction perpendicular to the longitudinal direction.

As used herein, the term 'length' is used to describe the maximum longitudinal dimension between the distal or upstream end and the proximal or downstream end of components, aerosol-generating devices, aerosol-generating articles and charging units.

As used herein, the term 'diameter' is used to describe the maximum transverse dimension of components, aerosol-generating devices, aerosol-generating articles and charging units.

As used herein, the term 'transverse cross-section' is used to describe the cross-section of components, aerosol-generating devices, aerosol-generating articles and charging units in the direction perpendicular to the major axis of the components, aerosol-generating devices, aerosol-generating articles and charging units, respectively.

At least one of the electrical contacts of each of the first and second connector parts may be configured to transfer, convey or supply power from the charging unit to the aerosol-generating device. For example, the first electrical contact of each of the first and second connector parts may be configured to transfer power from the charging unit to the aerosol-generating device. In particular, at least one of the electrical contacts of each of the first and second connector parts may be configured to transfer power from an electrical power supply of the charging unit to a rechargeable electrical power supply of the aerosol-generating device. At least one of the electrical contacts of each of the first and second connector parts may also be configured as a ground connection. For example, the third electrical contact of each of the first and second connector parts may be configured as a ground connection.

At least one of the electrical contacts of each of the first and second connector parts may be configured to transfer data from at least one of the charging unit to the aerosol-generating device and the aerosol-generating device to the charging unit. In some embodiments, at least one of the electrical contacts of each of the first and second connector parts may be configured to transfer data from the charging unit to the aerosol-generating device. For example, the second electrical contact of each of the first and second connector parts may be configured to transfer data from the charging unit to the aerosol-generating device. In some embodiments, at least one of the electrical contacts of each of the first and second connector parts may be configured to transfer data from the aerosol-generating device to the charging unit.

The first and second connector parts of the present invention may be configured to transfer power from the charging unit to the aerosol-generating device and to transfer data from at least one of the charging unit to the device and the device to the charging unit. Advantageously, this may enable the device to comprise a single electrical connector part only. This may reduce the size and weight of the aerosol-generating device compared to a device having a plurality of electrical connector parts.

Typically, the aerosol-generating device may comprise a rechargeable electrical power supply. The rechargeable electrical power supply may comprise any suitable type of rechargeable electrical power supply, such as batteries or capacitors. The rechargeable electrical power supply may comprise a lithium ion battery. The rechargeable electrical power supply of the aerosol-generating device may have a capacity sufficient for the aerosol-generating device to deliver one or more user experiences. A user experience generally comprises a series of puffs in which a user draws on the aerosol-generating device, the aerosol-generating device generates an aerosol by atomising an aerosol-forming substrate and the user inhales the aerosol generated by the device. The number of puffs constituting a typical user experience may be any suitable number. Typically, the number of puffs may be between two and twenty puffs, may be between four and twelve puffs and may be about six or seven puffs. The rechargeable electrical power supply of the aerosol-generating device may have a capacity sufficient for the aerosol-generating device to deliver any suitable number of user experiences. The rechargeable electrical power supply may have a capacity sufficient for the aerosol-generating device to deliver one, two, three, four, five or six user experiences.

Similarly, the charging unit may comprise an electrical power supply. The electrical power supply of the charging unit may comprise any suitable type of electrical power supply, such as batteries and capacitors. The electrical power supply of the charging unit may comprise a lithium ion battery. The first and second connector parts of the present invention may enable power to be transferred between the electrical power supply of the charging unit and the rechargeable electrical power supply of the aerosol-generating device for charging the rechargeable electrical power supply of the aerosol-generating device. Advantageously, this may extend the useable life of the aerosol-generating device. The electrical power supply of the charging unit may have a capacity sufficient to provide the aerosol-generating device with enough charge to deliver a plurality of user experiences. The electrical power supply of the charging unit may have a capacity sufficient to provide the aerosol-generating device with enough charge to deliver any suitable number of user experiences, such as between one and twenty user experiences, between five and fifteen user experiences and about 10 user experiences. Advantageously, this may enable a user carrying both the aerosol-generating device and the charging unit to use the aerosol-generating device for an extended period of time, such as over a day or a week, without connection of the aerosol-generating device to an external electrical power supply, such as a mains power supply, for charging the rechargeable electrical power supply of the aerosol-generating device.

Typically, the electrical power supply of the charging unit may be rechargeable. The electrical power supply of the charging unit may have a larger capacity than the rechargeable electrical power supply of the aerosol-generating device. The electrical power supply of the charging unit may be physically larger than the rechargeable electrical power supply of the aerosol-generating device.

The aerosol-generating device may be a handheld device. In other words, the aerosol-generating device may have any size and shape suitable to be held in the hand of a user. The aerosol-generating device may have a size and shape similar to a conventional cigarette or cigar. The aerosol-generating device may be portable. Typically, the charging unit may also be portable. The charging unit may have any suitable size and shape. The charging unit may have a size and shape similar to a conventional packet of cigarettes. Providing a portable charging unit may enable a user to carry the charging unit with the aerosol-generating device. Advantageously, this may enable the rechargeable electrical power supply of the aerosol-generating device to be made smaller and more lightweight without sacrificing the operating lifetime of the aerosol-generating device, which is able to be charged from the portable charging unit carried by the user when the rechargeable power supply of the device is depleted.

In some embodiments, at least one of the electrical contacts of each of the first and second connector parts may be configured to transfer data from the charging unit to the aerosol-generating device. This may advantageously enable software updates to be transferred from the charging unit to the aerosol-generating device. In some embodiments, at least one of the other electrical contacts of each of the first and second connector parts may be configured to transfer data from the aerosol-generating device to the charging unit. This may enable usage data to be transferred from the aerosol-generating device to the charging unit. Usage data may include, for example, one or more of state of charge of the rechargeable electrical power supply of the device, number of uses of the device, number of uses of the atomiser and aerosol-forming substrate identification information.

In some embodiments, the first electrical contacts of the first and second connector parts may be configured to transfer power between an electrical power supply of the charging unit and a rechargeable electrical power supply of the aerosol-generating device, the second electrical connectors of the first and second connector parts may be configured to transfer data from at least one of the charging unit to the aerosol-generating device and the aerosol-generating device to the charging unit and the third electrical contacts of the first and second connector parts may be configured as a ground connection.

The electrical contacts may be made from any suitable electrically conductive material. For example, the electrical contacts may be made from a metal such as copper or gold. In some embodiments the electrical contacts are made from the same material and in other embodiments, the electrical contacts are made from different materials.

Typically, the electrical contacts of each of the first and second connector parts are electrically separated or isolated from each other. The first, second and third electrical contacts of the first connector part may be electrically separated or isolated from each other. Similarly, the first, second and third electrical contacts of the second connector part may be electrically separated or isolated from each other. The electrical separation or isolation of the electrical contacts of each connector part may be provided by an electrically insulating material arranged between adjacent electrical contacts. The electrical separation or isolation may be provided by spacing apart adjacent electrical contacts.

As used herein, 'electrically conductive' refers to material having an electrical resistivity of $1 \times 10^{-4}$ $\Omega$m, or less. As used herein, 'electrically insulating' refers to material having an electrical resistivity of $1 \times 10^{4}$ $\Omega$m or more.

The electrical contacts of the first and second connector parts may be any suitable type of electrical contact. The electrical contacts may be pin contacts. Pin contacts may extend or project outwards from a surface, typically substantially perpendicularly to the plane of the surface. The pin contacts may be pogo pin contacts. In other words, the pin contacts may be resilient or spring loaded contacts. The electrical contacts may be plate contacts. Plate contacts may extend substantially on or in a plane or on or along a surface. The electrical contacts may be provided on a printed circuit board. In some embodiments, all of the electrical contacts may be the same type of electrical contact. In other embodiments, the electrical contacts may comprise different types of electrical contact. The electrical contacts of the first connector part may comprise one type of electrical contact and the electrical contacts of the second connector part may comprise a different type of electrical contact.

The first, second and third electrical contacts of the first connector part may be the same type of electrical contact. Typically, the electrical contacts of the first connector part are plate electrical contacts. In other words, typically the electrical contacts of the first connector part extend substantially on or in a plane or on or along a surface of the first connector part. Typically, the first connector part comprises one or more surfaces and each one of the first, second and third electrical contacts of the first connector part extends substantially on or along one of the one or more surfaces of the first connector part.

In some embodiments, the first, second and third electrical contacts of first connector part may extend substantially on or in the same plane. In some embodiments, the first connector part comprises a substantially planar surface and the first, second and third electrical contacts of the first connector part extend substantially on or in the plane of the surface. In some embodiments, the first, second and third contacts of the first connector part may extend in different planes. In some of these embodiments, the first and third electrical contacts of the first connector part may substantially extend on or in substantially parallel planes and the second electrical contact of the first connector part may extend on or in a plane or along a surface that is substantially perpendicular to the planes of the first and third electrical contacts.

The first, second and third electrical contacts of the first connector part may be arranged in any suitable arrangement. In some particular embodiments, the first connector part comprises a substantially circular face and the first electrical contact of the first connector part is arranged substantially centrally on the circular face. In some particular embodiments, the second and third electrical contacts of the first connector part are arranged around the first connector part. Typically, the first and second electrical contacts of the first connector part are spaced radially outwardly from the first electrical contact. In some embodiments, the second and third electrical contact may be spaced from the first electrical contact by the same distance. In some embodiments, the third electrical contact may be spaced further from the first electrical contact than the second electrical contact.

The first electrical contact of the first connector part may be substantially circular. In some embodiments, each one of the second and third electrical contacts of the first connector part form a segment of an arc. The second and third electrical contacts of the first connector part may form a segments of arcs having substantially the same radii. In these embodiments, the second and third electrical contacts of the first connector part may be arranged such that the second and third electrical contacts substantially circumscribe, surround or enclose the first contact. For example, the second electrical contact may extend around substantially one half of the first electrical contact and the third electrical contact may extend substantially around the other, opposing half of the first electrical contact. In some embodiments, the second and third electrical contacts of the first connector part are substantially annular. In other words, each one of the second and third electrical contacts may form a ring which substantially circumscribes the first electrical contact. The second and third electrical contacts of the first connector part may form concentric rings circumscribing the first electrical contact. In some particular embodiments:

the first electrical contact of the first connector part is substantially circular and is arranged substantially centrally on a face of the first connector part;

the second electrical contact of the first connector part is arranged on the face of the first connector part and forms a ring circumscribing the first electrical contact; and the third electrical contact of the first connector part is arranged on the face of the first connector part and forms a ring circumscribing the first and second electrical contacts.

The first, second and third electrical contacts of the second connector part may be the same type of electrical contact. Typically, the electrical contacts of the second connector part are pin electrical contacts. In other words, typically the electrical contacts of the second connector part extend outwards from a plane or surface of the second connector part, typically substantially perpendicularly to the plane or surface. Typically, the second connector part comprises one or more surfaces and each one of the first, second and third electrical contacts of the first connector part extends perpendicularly from one of the one or more surfaces of the second connector part.

In particular, the electrical contacts of the second electrical connector part may be pogo pin electrical contacts. Pogo pin electrical contacts may advantageously help to maintain a reliable electrical connection between the first and second connector parts when the first and second connector parts are electrically engaged and are exposed to vibrations and small movements caused by movement of the user.

In some embodiments, the first second and third electrical contacts of the second connector part extend substantially in the same direction. In some embodiments, the first, second and third electrical contacts of the second connector part may extend in parallel directions. In some embodiments, the first second and third electrical contacts of the second connector may extend substantially in different directions. The first and third electrical contacts may extend in the same, substantially parallel direction and the second electrical contact may extend in a different direction, substantially parallel to the direction of the first and third electrical contacts.

In some embodiments, the first, second and third electrical contacts of second connector part may extend substantially from the same plane or surface of the second connector part. In some embodiments, the second connector part comprises a substantially planar surface and the first, second and third electrical contacts extend substantially from the plane of the planar surface. In some embodiments, the first, second and third contacts may extend from different planes or surfaces of the second connector part.

The first, second and third electrical contacts of the second connector part may be arranged in any suitable arrangement. The first electrical contact of the second connector part may be arranged substantially centrally on a face of the second connector part. The first, second and third electrical contacts of the second connector part may be arranged substantially linearly across a face of the second connector part. The first, second and third electrical contacts of the second connector parts may be spaced regularly across a face of the second connector part. In some particular embodiments, the second connector part may comprise a substantially circular face and the first electrical contact of the second connector part may be arranged substantially centrally on the circular face. In these particular embodiments, the second and third electrical contacts of the second connector part are spaced radially outwardly from the centre of the circular face of the second connector part, since the second and third electrical contacts are spaced radially outwardly from the first electrical contact.

In some embodiments, the first connector part comprises a substantially circular face and the first electrical contact of the first connector part is arranged substantially centrally on the circular face and the second connector part comprises a substantially circular face and the first electrical contact of the second connector part is arranged substantially centrally on the circular face. In these embodiments, the first and second connector parts may be electrically engaged when the circular faces of the first and second connector parts are aligned and arranged in contact with each other. Furthermore, in these embodiments, the first connector part may be rotated relative to the second connector part about an axis passing through the centre of the circular faces of the first and second connector parts, without the electrical engagement between the first electrical contacts of the first and second connector parts being broken.

In some particular embodiments, the first connector part may comprise a substantially planar face and a recess arranged substantially centrally in the substantially planar face. The recess may extend inwards, substantially perpendicularly from the planar face. The recess may have a closed end, an open end at the face and at least one sidewall extending between the open end and the closed end. The first electrical contact of the first connector part may be arranged at the closed end of the recess. The second electrical contact of the first connector part may be arranged at the at least one sidewall of the recess and substantially circumscribes the first electrical contact. The third electrical contact of the first connector part may be arranged at the face and substantially circumscribes the recess and the first and second electrical contacts.

In these particular embodiments, the second connector part may comprise a substantially planar face and a projection arranged substantially centrally in the planar face. The projection may extend outwards from the face, substantially perpendicularly to the plane of the face. The projection may be configured to be received in the cavity of the first connector part. The projection may have an end face and at least one sidewall extending between the face and the end face of the projection. The first electrical contact of the second connector part may be arranged at the end face of the projection. The second electrical contact of the second connector part may be arranged at the at least one sidewall of the projection. The third electrical contact of the second connector part may be arranged at the planar face.

In these particular embodiments, the first and second connector parts may be electrically engaged by inserting the projection of the second connector part into the recess of the first connector part. When the first and second connector parts are electrically engaged:

the first electrical contact of the second connector part, at the end face of the projection, may electrically engage the first electrical contact of the first connector part, at the closed end of the recess;

the second electrical contact of the second connector part, at the sidewall of the projection, may electrically engage the second electrical contact of the first connector part, at the sidewall of the recess; and the third electrical contact of the second connector part, at the substantially planar face, may electrically engage the third electrical contact of the first connector part, at the substantially planar face.

In these particular embodiments, the recess and the projection of the first and second connector parts may be substantially circularly cylindrical. This may enable the first and second connector parts to be freely rotated relative to each other about the axes of the recess and projection. This may enable the first and second connector parts to be electrically engaged regardless of the angular position of the first connector part relative to the second connector part.

The second electrical contact of the second connector part arranged at the sidewall of the projection may closely fit inside the recess of the first connector part, such as by a friction or interference fit, in order to achieve a reliable electrical engagement with the second electrical contact of the first connector part on the sidewall of the recess. The second electrical contact of the second connector part and the recess may be configured such that the second electrical contact of the second connector part snap fits into the recess when the projection is received in the recess and the first and second connector parts are electrically engaged.

The recess may have any suitable shape and dimensions. The recess may be substantially cylindrical. The recess may have a substantially circular transverse cross-section. The diameter of the recess is less than the diameter of the face. The diameter of the recess may be equal to or less than 75% of the diameter of the face or may be equal to or less than about 50% of the diameter of the face.

The projection may have any suitable shape and dimensions. The projection may be substantially cylindrical. The projection may have a substantially circular transverse cross-section. The diameter of the projection is less than the diameter of the face. The diameter of the projection may be equal to or less than 75% of the diameter of the face or may be equal to or less than about 50% of the diameter of the face.

In some embodiments, the intersection between the end face and the sidewall of the projection may be inclined, bevelled or chamfered to facilitate location of the projection in the recess of the first connector part.

The second connector part may comprise a body on which the electrical contacts are mounted. The projection may be formed integrally with the body or may be a separate part that is secured to a main body portion.

The aerosol-generating device has one of the first connector part and the second connector part and the charging unit has the other one of the first connector part and the second connector part. In some embodiments, the first connector part may be provided on the device and the second connector part may be provided on the charging unit. Where the electrical contacts of the second connector part are pin contacts, it may be advantageous to provide the second connector on the charging unit, since the charging unit may provide improved protection for the pin contacts from damage.

The aerosol-generating device may have a proximal end and a distal end, opposite the proximal end. The proximal end may be the end at which a user draws on the aerosol-generating device to inhale aerosol generated by the device. Accordingly, the proximal end may also be referred to as the mouth end. One of the first and second connector parts may be provided at the distal end of the aerosol-generating device. One of the first and second connector parts may be provided at a distal end face of the aerosol-generating device.

The aerosol-generating device may have any suitable size and shape.

The aerosol-generating device may have a transverse cross-section of any suitable shape. For example, the aerosol-generating device may have a substantially circular, elliptical, triangular, square, rhomboidal, trapezoidal, pentagonal, hexagonal or octagonal transverse cross-section. In some particular embodiments, the aerosol-generating device has a substantially circular transverse cross-section.

The aerosol-generating device may have a substantially constant transverse cross-section along its length. The aerosol-generating device may have a substantially circular transverse cross-section along its length. The device may have rotational symmetry about its longitudinal axis. The device may have rotational symmetry of an order greater than one about its longitudinal axis. The device may be substantially axisymmetric about its longitudinal axis. In particular embodiments, the aerosol-generating device may be substantially circularly cylindrical.

The aerosol-generating device may have any suitable diameter and any suitable length. The aerosol-generating device may be elongate. In some particular embodiments, the aerosol-generating device may have a shape, diameter and length substantially similar to a conventional cigarette or cigar. The aerosol-generating device may have a length between about 30 mm and about 150 mm or between about 50 mm and 120 mm or between about 90 mm and 100 mm. The aerosol-generating device may have an external diameter between about 5 mm and about 30 mm or between about 10 mm and about 20 mm or about 15 mm.

The aerosol-generating device may be configured to receive one or more of a cartridge, an atomiser and an aerosol-generating article. The aerosol-generating device may be configured to receive one or more of a cartridge, an atomiser and an aerosol-generating article at a proximal end. The device may comprise a cavity for receiving one or more of a cartridge, an atomiser and an aerosol-generating article.

In some embodiments, the aerosol-generating device may comprise an atomiser. Where the aerosol-generating device comprises an atomiser, the device may be configured to receive an article comprising an aerosol-forming substrate or a cartridge comprising an aerosol-forming substrate. In other embodiments, the aerosol-generating device may be configured to receive an atomiser or a combination of an atomiser and an article or a cartridge comprising an aerosol-forming substrate. Where the device comprises a cavity for receiving one or more of a cartridge and an aerosol-generating article, the atomizer may be arranged in the cavity.

The device may comprise the one of the first and second connector parts at the distal end of the device. The device may comprise the one of the first and second connector parts at a distal end face of the device. In other words, a face at the distal end of the device, opposite the mouth end, may comprise the one of the first and second connector parts. The distal end face of the device may be substantially circular.

The aerosol-generating device may comprise a housing. In particular embodiments, the housing may be substantially circularly cylindrical. The housing may comprise any suitable material or combination of materials. Examples of suitable materials include metals, alloys, plastics or composite materials containing one or more of those materials, or thermoplastics that are suitable for food or pharmaceutical applications, for example polypropylene, polyetheretherketone (PEEK) and polyethylene. In particular embodiments, the material is light and non-brittle.

The rechargeable electrical power supply of the aerosol-generating device may be housed within the housing. The housing may comprise a cavity for receiving one or more of an aerosol-generating article and a cartridge. The aerosol-generating device may comprise an atomiser. The atomiser may be an electric heater. Where the device comprises a cavity for receiving an aerosol-generating article or a cartridge, the atomiser may be arranged in the cavity.

The aerosol-generating device may comprise electrical circuitry. The electric circuitry may be configured to control the transfer of power from the charging unit to the aerosol-generating device when the first and second connector parts are in electrical engagement. The electric circuitry may be configured to control the transfer of data from one or more of the charging unit to the aerosol-generating device and the aerosol-generating device to the charging unit. The electric circuitry may comprise a microprocessor.

The charging unit may have any suitable size and shape.

The charging unit may have a transverse cross-section of any suitable shape. For example, the charging unit may have a substantially circular, elliptical, triangular, square, rhomboidal, trapezoidal, pentagonal, hexagonal or octagonal transverse cross-section. In some particular embodiments, the aerosol-generating device has a substantially rectangular transverse cross-section.

The charging unit may have a substantially constant transverse cross-section along its length. The charging unit may have a substantially rectangular transverse cross-section along its length. In particular embodiments, the charging unit may be a substantially rectangular cuboid.

The charging unit may have any suitable diameter and any suitable length. In some embodiments, the aerosol-generating device may have a shape, diameter and length substantially similar to a conventional pack of cigarettes. The charging unit may have a length between about 50 mm and about 200 mm. The charging unit may have an external diameter between about 10 mm and about 150 mm, or between about 50 mm and about 100 mm.

The charging unit may have a cavity configured to receive the aerosol-generating device. The cavity may be configured to receive a distal end of the aerosol-generating device. The cavity may be configured to receive the entire aerosol-generating device. The cavity of the charging unit may have any suitable size and shape for receiving the aerosol-generating device.

The cavity of the charging unit may have a transverse cross-section of any suitable shape. For example, the cavity may have a substantially circular, elliptical, triangular, square, rhomboidal, trapezoidal, pentagonal, hexagonal or octagonal transverse cross-section. In particular embodiments, the cavity of the charging unit may have a transverse cross-section of substantially the same shape as the transverse cross-section of the aerosol-generating device to be received in the cavity. In some particular embodiments, the cavity may have a substantially circular cross-section.

The cavity of the charging unit may have a substantially constant transverse cross-section along its length. The cavity may have a substantially circular transverse cross-section along its length. The cavity may be substantially circularly cylindrical. The cavity may be substantially axisymmetric about its longitudinal axis.

The cavity of the charging unit may have any suitable diameter and any suitable length.

In particular embodiments, the cavity of the charging unit may have a diameter substantially equal to or slightly greater than the diameter of the aerosol-generating device.

The cavity of the charging unit may be elongate. The cavity may have a length that is less than the length of the aerosol-generating device so that when the distal end of the aerosol-generating device is received in the cavity of the charging unit the proximal or downstream end of the aerosol-generating device projects from the cavity. The cavity of the charging unit may have a length that is substantially equal to or slightly greater than the length of the aerosol-generating device such that substantially the entire length of the aerosol-generating device is received in the cavity of the charging unit. Advantageously, this may enable the device to be entirely enclosed within the cavity and may enable the charging unit to protect the device from the external environment.

One of the first and second connector parts may be arranged in the cavity of the charging unit. This arrangement may substantially shield or protect the connector part from the external environment. The cavity may have an open end. The open end may enable the aerosol-generating device to be inserted into the cavity and removed from the cavity. The cavity may also have a closed end, opposite the open end. The one of the first and second connector parts may be arranged at the closed end of the cavity of the charging unit.

In some particular embodiments, one of the first and second connector parts may be arranged at an end face at the distal end of the aerosol-generating device and the other one of the first and second connector parts may be arranged at an end face at the closed end of the cavity of the charging unit. In these particular embodiments, the first and second connector parts may be electrically engaged by inserting the distal end of the aerosol-generating device into the open end of the cavity of the charging unit and bringing the connector part arranged at the distal end face of the device into contact with the connector part arranged at the closed end face of the cavity of the charging unit.

Where the aerosol-generating device and the cavity of the charging unit are substantially circularly cylindrical, the aerosol-generating device may be freely rotated about its longitudinal axis in the cavity. In these embodiments, the first and second connector parts enable the device to be inserted into the cavity at any angular position relative to the cavity of the charging unit and enable the aerosol-generating device to be rotated in the cavity without breaking the electrical connection between the first and second connector parts.

The charging unit may comprise a housing. In particular embodiments, the housing may be a substantially rectangular cuboid. The housing may comprise any suitable material or combination of materials. Examples of suitable materials include metals, alloys, plastics or composite materials containing one or more of those materials, or thermoplastics that are suitable for food or pharmaceutical applications, for example polypropylene, polyetheretherketone (PEEK) and polyethylene. In particular embodiments, the material is light and non-brittle.

Where the charging unit comprises a cavity for receiving the aerosol-generating device, the housing may define the cavity. The charging unit may comprise means for closing an open end of the cavity, such as a lid hingedly connected to the housing.

Where the charging unit comprises an electrical power supply, the electrical power supply may be housed in the housing. The charging unit may comprise means for connecting the charging unit to an external electrical power supply, such as a mains power supply, for recharging the electrical power supply of the charging unit.

The charging unit may comprise electrical circuitry. The electric circuitry may be configured to control the transfer of power from the charging unit to the aerosol-generating device when the first and second connector parts are in electrical engagement. The electric circuitry may be configured to control the transfer of data from one or more of the charging unit to the aerosol-generating device and the aerosol-generating device to the charging unit. The electric circuitry may comprise a microprocessor.

The electrically operated aerosol-generating system may further comprise retention means for releasably retaining electrical engagement of the first connector part and the second connector part when the aerosol-generating device is received by the charging unit.

The retention means may be any suitable means for releasably retaining the electrical engagement of the first and second connector parts. For example, the retention means may comprise a friction fit between the aerosol-generating device and the charging unit, when the aerosol-generating device is received by the charging unit. For example, the retention means may comprise a closure, such as a lid, configured to removably cover the open end of the cavity of the charging unit. For example, the retention means may comprise resilient means arranged on the charging unit to urge the first connector part against the second connector part when the aerosol-generating device is received by the charging unit. The resilient retention means may comprise a spring, such as a leaf spring.

In some particular embodiments, the retention means may comprise magnetic retention means. The magnetic retention means may comprise a first magnetic material and a second magnetic material. The first magnetic material may be provided in the aerosol-generating device and the second magnetic material may be provided in the charging unit.

The first and second magnetic materials may be arranged such that the first and second magnetic materials are proximate each other when the aerosol-generating device is received by the charging unit. The first and second magnetic materials may be arranged such that the first and second magnetic materials are attracted to each other when the aerosol-generating device is received by the charging unit. The first and second magnetic materials may be arranged such that the first and second connector parts are releasably retained in electrical engagement when the aerosol-generating device is received by the charging unit.

The term 'magnetic material' is used herein to describe a material which is able to interact with a magnetic field, including both paramagnetic and ferromagnetic materials. A magnetisable material may be a paramagnetic material, such that it only remains magnetised in the presence of an external magnetic field. Alternatively, a magnetisable material may be a material which becomes magnetised in the presence of an external magnetic field and which remains magnetised after the external field is removed (a ferromagnetic material, for example). The term "magnetic material" as used herein encompasses both types of magnetisable material, as well as material which is already magnetised.

At least one of the first and second magnetic materials may comprise an alloy of neodymium, such as neodymium, iron and boron. In other words, at least one of the first and second magnetic materials may be a neodymium magnet. At least one of the first and second magnetic materials may comprise a ferromagnetic stainless steel, such as SS430 stainless steel.

The first magnetic material may be arranged proximate the one of the first and second connector parts of the aerosol-generating device. The second magnetic material may be arranged proximate the other one of the first and second connector parts of the charging unit. In this arrangement, when the first and second connector parts are not electrically engaged, the magnetic retention means may cause the first and second connector parts to be drawn together into electrical engagement. Advantageously, this provides a degree of self-alignment and self-engagement to the first and second connector parts, facilitating electrical engagement. Accordingly, the magnetic retention means may further improve the speed and ease with which a user is able to electrically connect a device and a charging unit. When the first and second connector parts are electrically engaged, the magnetic retention means increases the specific force required to disengage the first and second connector parts. Advantageously, this substantially inhibits or prevents the first and second connector parts from becoming unintentionally disengaged, for example though vibrations and rotation during transit.

As used herein, the term "proximate" is used to describe a relative arrangement of two objects in close proximity to each other, such as adjacent or neighbouring objects. Magnetic material arranged proximate to a connector part refers to magnetic material that is arranged at or on the connector part or separated from the connector part by a short distance. In this context, a short distance is a distance that is small relative to the dimensions of the aerosol-generating device and the charging unit.

In some embodiments, at least one of the first and second magnetic materials may form one or more of the electrical contacts of the connector parts. For example, the third electrical contact of the first connector part may be formed from a magnetic material. In embodiments where magnetic material does not form one of the electrical contacts, the magnetic material may be electrically isolated from the electrical contacts of the connector part.

The first magnetic material may be arranged at or around the connector part of the aerosol-generating device. The first magnetic material may comprise a body of magnetic material arranged substantially behind the electrical contacts of the connector part of the aerosol-generating device. Where the device comprises the connector part at the distal end face, the first magnetic material may be arranged proximally of the connector part in the device. Where the aerosol-generating device comprises the first connector part, the first magnetic material may comprise at least one of the electrical contacts of the first connector part. In particular, the third electrical contact may comprise a magnetic material, such that the third electrical contact is the first magnetic material. In embodiments where the first magnetic material is not one or more of the electrical contacts, the first magnetic material may be electrically isolated from the electrical contacts of the first connector part.

The second magnetic material may be arranged at or around the connector part of the charging unit. The second magnetic material may comprise a body of magnetic material arranged substantially behind the electrical contacts of the connector part of the charging unit. Where the charging unit comprises the second connector part, the second magnetic material may comprise one or more bodies of magnetic material arranged between or around the electrical contacts of the second connector part. In particular, the second magnetic material may comprise two bodies of magnetic material arranged at opposite sides of the electrical contacts of the second connector part, such that the electrical contacts of the second connector part are arranged between the two bodies of magnetic material. The two bodies of magnetic material may be substantially arcuate and may have the same or a similar curvature to the third electrical contact of the first connector part.

The first and second magnetic materials may be any suitable shape. For example, the first and second magnetic materials may be substantially circular, elliptical or square. The first and second magnetic materials may be the same shape. The first and second magnetic materials may be different shapes. The first and second magnetic materials may be substantially annular. The first and second magnetic materials may comprise an annular body, ring or tube of magnetic material. Providing an annular body, ring or tube of magnetic material may be advantageous, as the annular body or tube may comprise a central passage through which electrical connectors may pass to connect one or more electrical contacts of the connector part to an electrical power supply of the device or the charging unit.

Where the charging unit comprises a cavity and the connector part of the charging unit is arranged at a closed end of the cavity, the first and second magnetic materials may be arranged such that the magnetic north-south polarity of the magnetic materials is substantially aligned with the longitudinal axis of the cavity. This may enable the magnetic retention means to help draw the aerosol-generating device into the cavity and locate the first and second connector parts in electrical engagement.

In some particular embodiments, the electrical connector comprises a first connector part comprising a face and a recess arranged substantially centrally in the face, the recess having a closed end, an open end at the face and a sidewall extending between the open end and the closed end. The first connector part further comprises: a first electrical contact arranged at the closed end of the recess; a second electrical contact arranged at the sidewall of the recess and substantially circumscribing the first electrical contact; and a third electrical contact arranged at the face and substantially circumscribing the first electrical contact.

In this arrangement, the second and third electrical contacts may form concentric rings or bands. The second electrical contact may form an elongate, thin ring at the sidewall of the recess and the third electrical contact may form a wide flat ring at the face of the first connector part. The first electrode may form a flat circular ring at the end face of the recess.

In these particular embodiments, at least one of the electrical contacts of the first connector part may be formed from a magnetic material. In particular, the third electrical contact may be formed from a magnetic material.

In some of the particular embodiments, the second connector part comprises a face and a projection arranged substantially centrally in the face, the projection having an end face and a sidewall extending between the face and the end face of the projection. The second connector part further comprises: a first electrical contact arranged at the end face of the projection; a second electrical contact arranged at the at least one sidewall of the projection and spaced radially outwardly from the first electrical contact; and a third electrical contact arranged at the face spaced radially outwardly from the first electrical contact.

In these particular embodiments, two bodies of magnetic material may be arranged on opposite sides of the electrical contacts of the second connector part. The two bodies of magnetic material may be electrically isolated from the electrical contacts of the second connector part. The two bodies of magnetic material may be substantially arcuate and may have a similar or the same curvature as the third electrical contact of the first connector part.

According to another aspect of the invention, there is provided an electrically operated aerosol-generating device comprising an electrical connector part. The electrical connector part comprises a face and a recess arranged substantially centrally in the face, the recess having a closed end, an open end at the face and a sidewall extending between the open end and the closed end. The electrical connector part further comprises: a first electrical contact arranged at the closed end of the recess; a second electrical contact arranged at the sidewall of the recess and substantially circumscribing the first electrical contact; and a third electrical contact arranged at the face and substantially circumscribing the first electrical contact.

In some embodiments, the electrically operated aerosol-generating device may comprise one or more of: a cavity for receiving an aerosol-forming substrate; an electric heater for heating an aerosol-forming substrate received in the cavity; a rechargeable power supply for supplying power to the electric heater; and electric circuitry for controlling the supply of power to the electric heater from the power supply and electrically connected to the electrical connector part for the transfer of at least one of power and data through the electrical connector part.

The electrical connector part may be arranged at an end face of the aerosol-generating device. Where the device comprises a cavity for receiving an aerosol-forming substrate at one end, the electrical connector part may be arranged at the opposite end.

According to another aspect of the invention, there is provided a charging unit comprising: a housing having a cavity for receiving an electrically operated aerosol-generating device; and an electrical connector part arranged to electrically connect to the electrically operated aerosol-generating device when the device is received in the cavity. The electrical connector part comprises: a face and a projection arranged substantially centrally in the face, the projection having an end face and a sidewall extending between the face and the end face of the projection; a first electrical contact arranged at the end face of the projection; a second electrical contact arranged at the at least one sidewall of the projection and spaced radially outwardly from the first electrical contact; and a third electrical contact arranged at the face spaced radially outwardly from the first electrical contact.

According to another aspect of the invention, there is provided an electrical connector for an electrically operated aerosol-generating system according to the first aspect of the present invention. The electrical connector comprises a first connector part and a second connector part. The first connector part includes: a first electrical contact; a second electrical contact at least partially circumscribing the first electrical contact; and a third electrical contact at least partially circumscribing the first electrical contact. The second connector part includes: a first electrical contact; a second electrical contact spaced radially outwardly from the first electrical contact; and a third electrical contact spaced radially outwardly from the first electrical contact. When the first and second connector parts of the electrical connector are electrically engaged: the first electrical contact of the first connector part electrically engages the first electrical contact of the second connector part; the second electrical contact of the first connector part electrically engages one of the second electrical contact and the third electrical contact of the second connector part; and the third electrical contact of the first connector part electrically engages the other one of the second electrical contact and the third electrical contact of the second connector part, regardless of the rotational orientation of the second connector part relative to the first connector part.

BRIEF DESCRIPTION OF THE DRAWINGS

The invention will be further described, by way of example only, with reference to the accompanying drawings, in which:

FIG. 9 shows a schematic illustration of a first connector part of an electrical connector according to a third embodiment of the present invention;

FIG. 10 shows a perspective view of the first connector part of FIG. 9;

FIG. 11 shows a schematic illustration of a second connector part of an electrical connector according to the third embodiment of the present invention, the second connector part being compatible with the first connector part of FIG. 9;

FIG. 12 shows a perspective view of the second connector part of FIG. 11;

DETAILED DESCRIPTION

Figure 1:
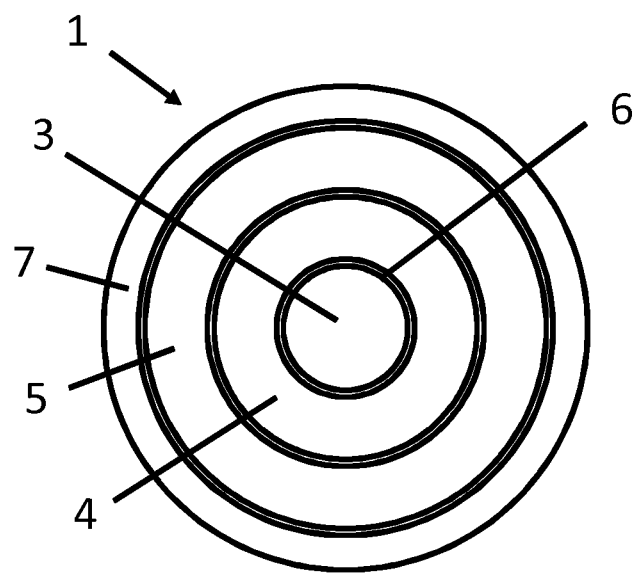
FIG. 1 shows a schematic illustration of a first connector part of an electrical connector according to a first embodiment of the present invention.
Figure 2:
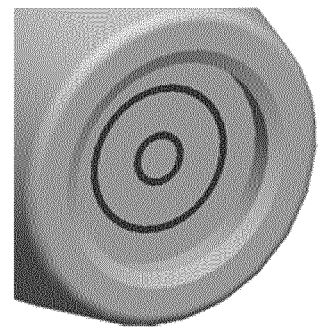
FIG. 2 shows a perspective view of the first connector part of FIG. 1.

FIGS. 1 and 2 show schematic illustrations of a first connector part 1 of an electrically operated aerosol-generating system according to a first embodiment of the present invention. The first connector part 1 is arranged at a distal end face of an aerosol-generating device (not shown). The first connector part 1 comprises three electrical contacts, a first electrical contact 3, a second electrical contact 4 and a third electrical contact 5.

The first, second and third electrical contacts 3, 4, 5 extend substantially over a substantially circular and planar face 6 of the first connector part 1. The first electrical contact 3 is substantially circular and arranged centrally on the face 6. The second electrical contact 4 forms a ring centred on the first electrical contact 3 and circumscribing the first electrical contact 3. The third electrical contact 5 forms a ring centred on the first electrical contact 3 and circumscribing both the first and second electrical contacts 3, 4. The first, second and third electrical contacts 3, 4, 5 are electrically isolated from each other. The second electrical contact 4 is spaced radially outwards from the first electrical contact 3 and the third electrical contact 5 is spaced radially outwards from the second electrical contact 4, such that a gap is provided between the first electrical contact 3 and the second electrical contact 4 and a gap is provided between the second electrical contact 4 and the third electrical contact 5.

The face 6 of the first connector part 1 is the distal end face of the aerosol-generating device. An outer rim 7 of the housing of the aerosol-generating device, which surrounds the first connector part 1, is raised, extending beyond the face 6 to provide a degree of protection to the electrical contacts 3, 4 and 5 from scratching and contact wear when the distal end face of the aerosol-generating device is brought into contact with objects in the external environment.

Figure 3:
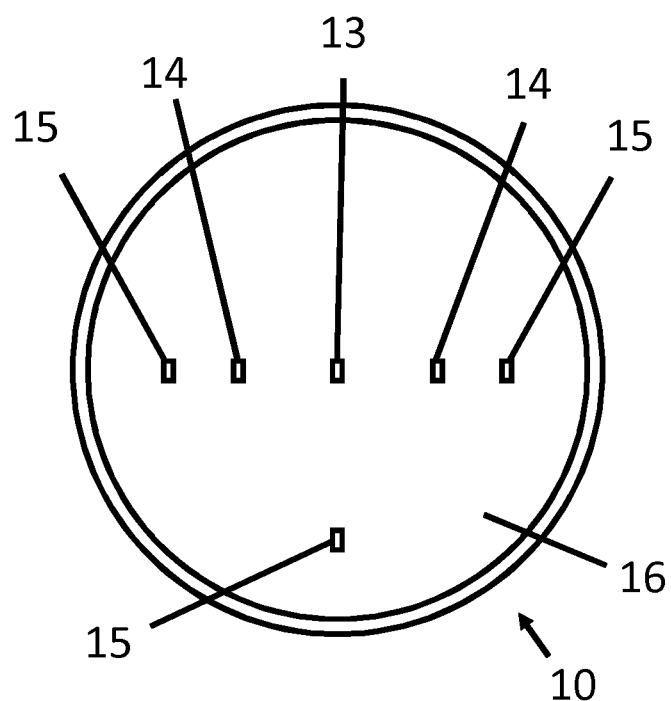
FIG. 3 shows a schematic illustration of a second connector part of an electrical connector according to the first embodiment of the present invention, the second connector part being compatible with the first connector part of FIG. 1.
Figure 4:
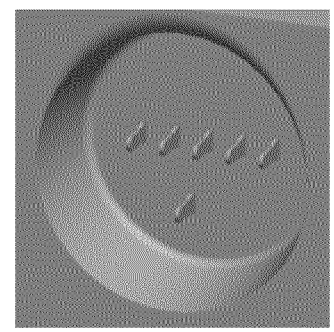
FIG. 4 shows a perspective view of the second connector part of FIG. 3.

FIGS. 3 and 4 show schematic illustrations of a second connector part 10 of the electrically operated aerosol-generating system according to the first embodiment of the present invention. The second connector part 10 is arranged at a closed end face of a cavity of a charging unit (not shown). The second connector part 10 comprises six pin type electrical contacts, a first electrical contact 13, two second electrical contacts 14 and three third electrical contacts 15.

The second connector part 10 comprises a substantially circular and planar face 16, which is substantially the same size as the face 6 of the first connector part. Each of the six pin type electrical contacts of the second connector part extend outwards from the face 16 in a direction substantially perpendicular to the face 16.

The first electrical contact 13 is arranged centrally on the face 16.

The pair of second electrical contacts 14 are spaced radially outwardly from the first electrical contact 13 in opposite directions. The pair of second electrical contacts 14 are spaced from the first electrical contact 13 by substantially equal distances. The distance between the second electrical contacts 14 and the first electrical contact 13 of the second connector part 10 is substantially equivalent to the distance between the first electrical contact 3 of the first connector part 1 and the second electrical contact 4 of the first connector part 1.

Two of the three third electrical contacts 15 of the second connector part are spaced radially outwardly from the first electrical contact 13 in opposite directions such that two third electrical contacts 15, the pair of second electrical contacts 14 and the first electrical contact 13 are arranged substantially in a line. The other third electrical contact 15 is spaced radially outwardly from the first electrical contact 13 in a direction substantially perpendicular to the line formed by the other electrical contacts. The three third electrical contacts 15 are spaced from the first electrical contact 13 by substantially equal distances. The distance between the third electrical contacts 15 and the first electrical contact 13 of the second connector part 10 is substantially equivalent to the distance between the first electrical contact 3 of the first connector part 1 and the third electrical contact 5 of the first connector part 1.

The first connector part 1 and the second connector part 10 may be electrically engaged by inserting the distal end of the aerosol-generating device into the cavity of the charging unit. The aerosol-generating device is substantially circularly cylindrical and the cavity of the charging unit is also substantially circularly cylindrical, having a diameter that is slightly larger than the diameter of the aerosol-generating device. Inserting the distal end of the aerosol-generating device into the cavity aligns the face 6 of the first connector part 1 and the face 16 of the second connector part 10. Aligning the faces 6 and 16 also aligns the first electrical contacts 3, 13 of the first and second connector parts 1, 10, aligns the second electrical contacts 4, 14 of the first and second connector parts 1, 10 and aligns the third electrical contacts 5, 15 of the first and second connector parts 1, 10. Accordingly, when the first connector part 1 is brought into contact with the second connector part 10, the first electrical contacts 3, 13 are electrically engaged, the second electrical contacts 4, 14 are electrically engaged and the third electrical contacts 5, 15 are electrically engaged.

Since the first electrical contacts 3, 13 are centred on the faces 6, 16, the second and third electrical contacts 4, 5 of the first connector part are concentric rings about the first electrical contact 3, and the second and third electrical contacts 14, 15 of the second connector part 10 are spaced at similar distances from the first electrical contact 13 to the second and third electrical contacts 4, 5 of the first connector part 1 to the first electrical contact 3, the angular position of the first connector part relative to the second connector part does not affect the electrical engagement of any of the electrical contacts. Therefore, the distal end of the aerosol-generating device may be inserted into the cavity of the charging unit at any angular position and the aerosol-generating device may be freely rotated in the cavity without affecting the electrical engagement of the first and second connector parts.

The aerosol-generating device comprises a rechargeable electrical power supply (not shown) and the charging unit comprises a rechargeable electrical power supply (not shown). The second electrical contacts 4, 14 are configured to transfer power from the rechargeable electrical power supply of the charging unit to the rechargeable electrical power supply of the aerosol-generating device. The third electrical contacts 5, 15 are configured to transmit data between the aerosol-generating device and the charging unit. The first electrical contacts 3, 13 of the first and second connector parts 1, 10 are configured as ground connections.

It will be appreciated that the second connector part may be provided with any suitable number of second and third electrical contacts. For example, the second connector part may be provided with three second electrical contacts and two third electrical contacts. It will also be appreciated that additional electrical contacts may be provided on both the first and second connector parts. For example, the first connector part may be provided with additional ring electrical contacts centred on the first electrical contact and spaced radially outwardly from the first electrical contact at a greater distance than the third ring electrical contact, and the second connector part may be provided with additional pin electrical contacts spaced radially outwardly from the first electrical contact at a greater distance than the third electrical contacts.

Figure 5:
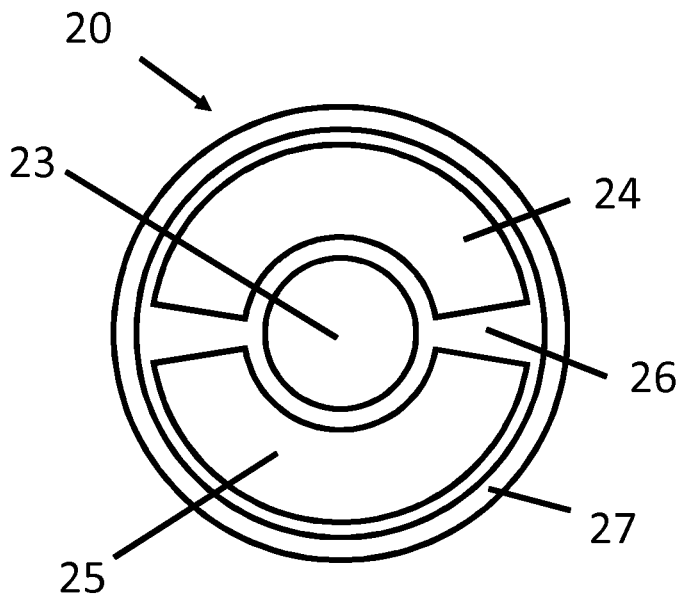
FIG. 5 shows a schematic illustration of a first connector part of an electrical connector according to a second embodiment of the present invention.
Figure 6:
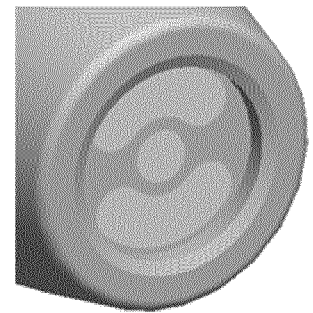
FIG. 6 shows a perspective view of the first connector part of FIG. 5.

FIGS. 5 and 6 show schematic illustrations of a first connector part 20 of an electrically operated aerosol-generating system according to a second embodiment of the present invention. The first connector part 20 is arranged at a distal end face of an aerosol-generating device (not shown). The first connector part 20 comprises three electrical contacts, a first electrical contact 23, a second electrical contact 24 and a third electrical contact 25.

The first, second and third electrical contacts 23, 24, 25 extend substantially over a substantially circular and planar face 26 of the first connector part 20. The first electrical contact 23 is substantially circular and arranged centrally on the substantially circular and planar face. The second electrical contact 24 forms a semi-circular arc centred on the first electrical contact 23 and circumscribing slightly less than half the first electrical contact 23 on one side of the first electrical contact 23. The third electrical contact 25 forms a semi-circular arc centred on the first electrical contact 23 and circumscribing slightly less than half the first electrical contact 23, on the other side of the first electrical contact 23. The second and third electrical contacts 24, 25 have substantially the same radius and are spaced radially outwardly from the first electrical contact 23 by substantially the same distance. The first, second and third electrical contacts 23, 24, 25 are electrically isolated from each other.

Similar to the first connector part 1 of the first embodiment of the present invention described above, the substantially circular and planar face 26 of the first connector part 20 is the distal end face of the aerosol-generating device. An outer rim 27 of the housing of the aerosol-generating device, which surrounds the first connector part 20, is raised, extending beyond the substantially circular and planar face 26.

Figure 7:
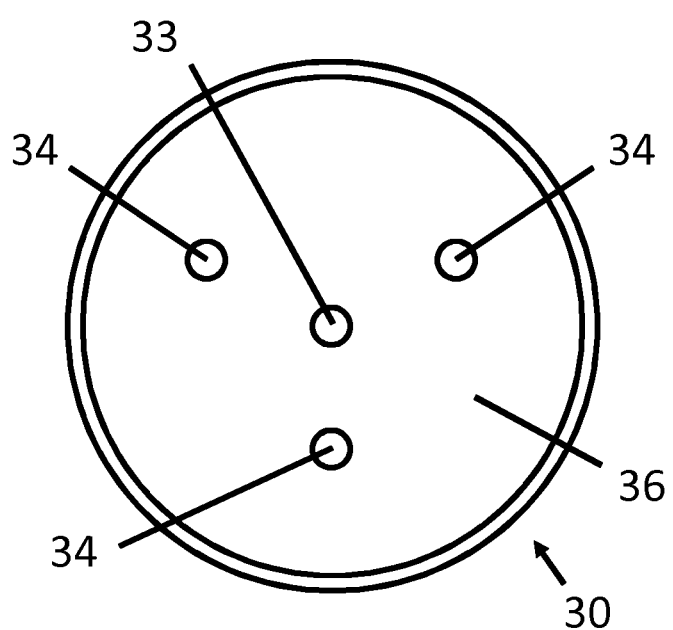
FIG. 7 shows a schematic illustration of a second connector part of an electrical connector according to the second embodiment of the present invention, the second connector part being compatible with the first connector part of FIG. 5.
Figure 8:
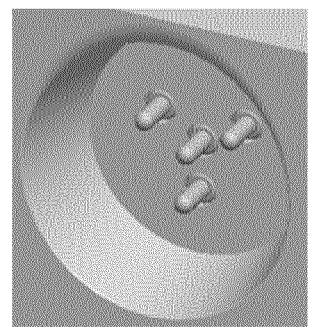
FIG. 8 shows a perspective view of the second connector part of FIG. 7.

FIGS. 7 and 8 show schematic illustrations of a second connector part 30 of the electrically operated aerosol-generating system according to the second embodiment of the present invention. The second connector part 30 is arranged at a closed end face of a cavity of a charging unit (not shown). The second connector part 30 comprises four pogo pin type electrical contacts, a first electrical contact 33 and three secondary electrical contacts 34.

The second connector part 30 comprises a substantially circular and planar face 36, which is substantially the same size as the face 26 of the first connector part. Each of the six pin type electrical contacts of the second connector part extend outwards from the face 36 in a direction substantially perpendicular to the face 36.

The first electrical contact 33 is arranged centrally on the face 36.

The three secondary electrical contacts 34 are spaced radially outwardly from the first electrical contact 33 in different directions. The three secondary electrical contacts 34 are spaced from the first electrical contact 33 by substantially equal distances, and are spaced at regular intervals around the face 36. The distance between the secondary electrical contacts 34 and the first electrical contact 33 of the second connector part 30 is substantially equivalent to the distance between the first electrical contact 23 of the first connector part 20 and the second and third electrical contacts 24, 25 of the first connector part 20.

As described for the first embodiment, when the distal end of the aerosol-generating device is inserted into the cavity of the charging unit, the first connector part 20 and the second connector part 30 are aligned and are brought into electrical engagement. When the faces 26, 36 of the first and second connector parts 20, 30 are aligned, the first electrical contacts 23, 33 are aligned, at least one of the three secondary electrical contacts 34 of the second connector part 30 is aligned with the second electrical connector 24 of the first connector part 20 and at least one of the three secondary electrical contacts 34 of the second connector part 30 is aligned with the third electrical contact 25 of the first connector part 20. Accordingly, when the first connector part 20 is aligned and brought into electrical engagement with the second connector part 30, the first electrical contacts 23, 33 of the first and second connector parts 20, 30 are electrically engaged, at least one of the secondary electrical contacts 34 of the second connector part 30 is electrically engaged with the second electrical contact 24 of the first connector part 20 and at least one of the secondary electrical contacts 34 of the second connector part 30 is electrically engaged with the third electrical contact 25 of the first connector part 20.

Similar to the first embodiment, the first electrical contacts 23, 33 are configured as ground connections. The second electrical contact 24 of the first connector part 20 is configured for data transfer between the aerosol-generating device and the charging unit and the third electrical contact 25 of the first connector part 20 is configured for power transfer from the power supply of the charging unit to the power supply of the aerosol-generating device. However, in this embodiment, the rotational or angular position of the second connector part 30 relative to the first connector part 20 affects which of the secondary electrical contacts 34 of the second connector part 30 are electrically engaged with the second electrical contact 24 of the first connector part 20 and which of the secondary electrical contacts 34 of the second connector part 30 are electrically engaged with the third electrical contact 25 of the first connector part 20. Accordingly, the electrically operated aerosol-generating system of the second embodiment requires electrical circuitry configured to detect which of the secondary electrical contacts 34 of the second connector part 30 are electrically engaged with the second electrical contact 24 of the first connector part 20, which is configured for power transfer, and which secondary electrical contacts 34 of the second connector part 30 are electrically engaged with the third electrical contact 25 of the first connector part 20, which is configured for data transfer. The electric circuitry is configured to detect which electrical contact of the first connector part 20 each secondary electrical contact 34 of the second connector part 30 is electrically engaged with. The electrical circuitry is further configured to alter which of the secondary electrical contacts 34 of the second connector part 30 is configured for power transfer and which of the secondary electrical contacts 34 of the second connector part 30 is configured for data transfer depending on the detected electrical engagements. Preferably, the electrical circuitry is provided in the charging unit, to keep the size and weight of the aerosol-generating device to a minimum.

FIGS. 9 and 10 show schematic illustrations of a first connector part 40 of an electrically operated aerosol-generating system according to a third embodiment of the present invention. The first connector part 40 is arranged at a distal end face of an aerosol-generating device (not shown). The first connector part 40 comprises three electrical contacts, a first electrical contact 43, a second electrical contact 44 and a third electrical contact 45.

The first connector part 40 comprises a substantially circular planar face 46 with a recess 48 located at the centre of the face. The recess 48 is substantially circularly cylindrical, having an open end at the face 46, an opposite closed end and a tubular sidewall extending between the open end and the closed end face. The closed end face of the recess is substantially circular and lies on a plane substantially parallel to the plane of the face 46. The circular face 46 has a diameter of about 10 mm and the recess 48 has a diameter of about 4 mm and a depth of about 4 mm.

The first electrical contact 43 is substantially circular and extends substantially over the closed end face of the recess 48. The outer edge of the first electrical contact 43 is defined by the sidewall of the recess 48, and so the diameter of the first electrical contact is the same as the diameter of the recess. The second electrical contact 44 is substantially tubular and extends substantially over the tubular sidewall of the recess 48. The second electrical contact 44 has a thickness of about 0.1 mm, such that positioning the second electrical contact 44 in the recess 48 does not significantly reduce the diameter of the recess 48. The second electrical contact 44 has a width of about 3.8 mm, and is positioned in the recess 48 such that the second electrical contact 44 does not extend to the closed end face of the recess 48. This positioning ensures that the second electrical contact 44 does not contact the first electrical contact 44. The third electrical contact 45 is substantially annular and extends substantially over the face 46. The third electrical 45 contact has an outer diameter of about 8 mm and an inner diameter of about 4.6 mm, such that the third electrical contact 45 does not contact the second electrical contact 44. In this arrangement, the first, second and third electrical contacts 43, 44, 45 are all electrically isolated from each other.

Unlike the first and second embodiments, the first second and third electrical contacts 43, 44, 45 do not all substantially on in the same plane. In this embodiment, the first and third electrical contacts 43, 45 lie on different but substantially parallel planes and the second electrical contact 44 extends on a surfaces that is substantially perpendicular to the planes of the first and third electrical contacts 43, 45.

In this embodiment, the first electrical contact is formed from a copper alloy, the second electrical contact is formed from SS304 stainless steel and third electrical contact 45 is formed from SS430 stainless steel.

FIGS. 11 and 12 show schematic illustrations of a second connector part 50 of the electrically operated aerosol-generating system according to the third embodiment of the present invention. The second connector part 50 is arranged at a closed end face of a cavity of a charging unit (not shown). The second connector part 50 comprises four electrical contacts, a first electrical contact 53, a second electrical contact 54 and two third electrical contacts 55.

The second connector part 50 comprises a substantially circular planar face 56 with a projection 58 located at the centre of the face. The projection 58 extends outwards from the face 56 in a direction substantially perpendicular to the plane of the face 56. The projection 58 is substantially circularly cylindrical and comprises an end face and a tubular sidewall extending between the face 56 and the open end face of the projection. The end face of the projection 58 is substantially circular and lies on a plane substantially parallel to the plane of the face 56. The projection has substantially the same shape as the recess 48 of the first connector part 40, has a height of about 3 mm and has a maximum diameter slightly smaller than the recess 48 of about 3.3 mm, such that the projection 58 of the second connector part 50 may fit closely within the recess 48 of the first connector part 40. The diameter or width of the projection 58 reduces towards the end face of the projection, such that the interface between the end face and the sidewall of the projection 58 is bevelled to make it easier to locate the projection 58 within the recess 48 of the first connector part 40.

The first electrical contact 53 is a pogo pin contact arranged on the end face of the projection 58. The first electrical contact 53 extends outwards from the end face of the projection 58, substantially in the same direction as the projection. The second electrical contact 54 is a leaf spring arranged at the sidewall of the projection 58. The second electrical contact 54 extends radially outwards from the sidewall of the projection 58, in a direction substantially perpendicular to the sidewall and substantially parallel with the plane 56, by a maximum distance of about 0.3 mm. The two third electrical contacts 55 are pogo pin contacts substantially similar to the first electrical contact 53. The two third electrical contacts 55 extend outwards from the face 56 in a direction substantially perpendicular to the face 56 and substantially parallel to the first electrical contact 53.

The two third electrical contacts 55 are spaced radially outwardly from the first electrical contact 53 in opposite directions, such that the first electrical contact 53 and the two third electrical contacts 55 are arranged substantially in a line. The two third electrical contacts 55 are spaced from the first electrical contact 53 by substantially equal distances of about 2.75 mm measured from the central axes of the contacts. The distance between the third electrical contacts 54 and the first electrical contact 53 of the second connector part 50 is greater than the diameter of the projection 58.

In this embodiment, the pogo pin contacts 53, 55 are formed from brass and the leaf spring contact 54 is formed from SS301 stainless steel.

The pogo pin contacts 53, 55 typically extend about 1 mm above the face of second connector part 50 from which they extend when they are not compressed, and about 0.5 mm above the face from which they extend when they are fully compressed.

The first and second connector parts 40, 50 comprise magnetic retention means. The magnetic retention means comprises a first magnetic material in the form of the third electrical contact 45 of the first connector part 40, which comprises a ring or band of a ferromagnetic metal. The magnetic retention means further comprises a second magnetic material 59 comprising a pair of arcuate bodies of a ferromagnetic material arranged at opposite sides of the electrical contacts of the second connector part 50. The second magnetic material 59 is electrically isolated from the electrical contacts of the second connector part 50.

In this embodiment, the third electrical contact 45 of the first connector part 40 (i.e. the first magnetic material) is formed from a ferromagnetic stainless steel, such as SS430 stainless steel, and the second magnetic material 59 is formed of an alloy of neodymium, iron and boron that is magnetised to form a permanent magnet.

When the first connector part 40 is moved into the proximity of the first connector part 50, the magnetic attraction between the first and second magnetic materials draws the first and second connector parts together, compressing the pogo pin contacts 53, 55 of the second connector part 50 and brining the electrical contacts of each connector part into electrical engagement. The magnetic retention means helps to retain the first and second connector parts in electrical engagement.

It will be appreciated that in other embodiments, the first magnetic material and second magnetic materials may be formed from alternative materials and may be arranged in different positions. For example, the first magnetic material may be arranged behind the electrical contacts of the first connector part 40, forming a ring of a ferromagnetic material that circumscribes the recess 48, beneath the third electrical contact 45.

It will also be appreciated that in other embodiments, the first magnetic material may comprise a magnetised material and the second magnetic material may comprise an unmagnetised magnetic material. In other embodiments, both the first and second magnetic materials may comprise magnetised magnetic materials.

Figure 13:
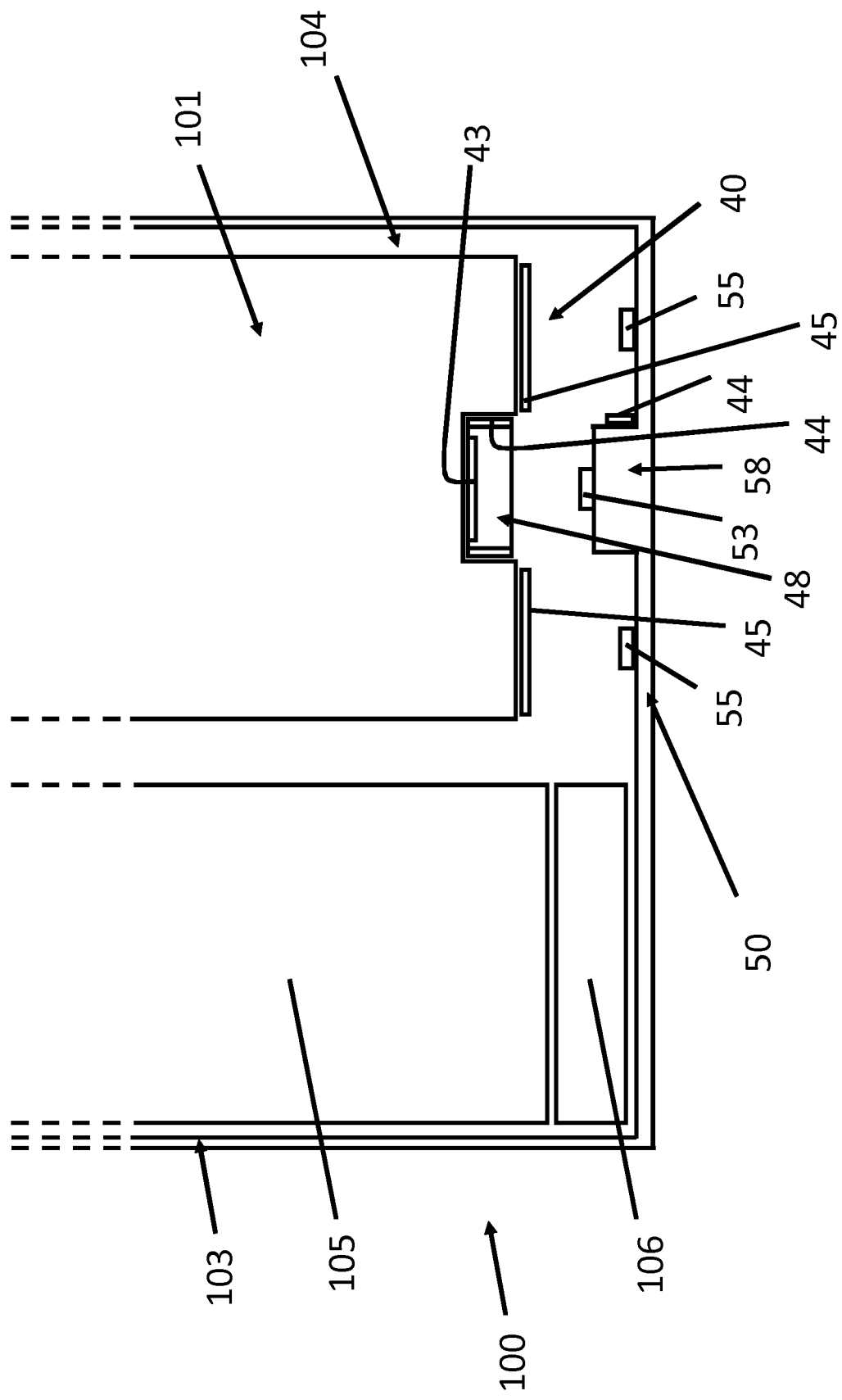
FIG. 13 shows a schematic illustration of an electrically operated aerosol-generating system comprising the electrical connector of the third embodiment of the present invention, the system comprising an aerosol-generating device including the first connector part of FIGS. 9 and 10 received in a charging unit comprising the second connector part of FIGS. 11 and 12.

FIG. 13 shows the first and second connector parts 40, 50 in position in an aerosol-generating system 100 according to the third embodiment of the present invention.

The aerosol-generating system 100 comprises an aerosol-generating device 101 having the first connector part 40 arranged at a distal end face. The aerosol-generating system 100 further comprises a charging unit 103 comprising a cavity 104 for receiving the distal end of the aerosol-generating device 101. The cavity 104 comprises the second connector part 50 at a closed end face. The charging unit 103 further comprises a battery 105 and electrical circuitry 106 housed in a housing. The housing defines the circularly cylindrical cavity 104.

The first connector part 40 and the second connector part 50 may be brought into electrical engagement by inserting the distal end of the aerosol-generating device 101 into the cavity 104 of the charging unit 103. The aerosol-generating device 101 is substantially circularly cylindrical and the cavity 104 of the charging unit 103 is also substantially circularly cylindrical, having a diameter that is slightly larger than the diameter of the aerosol-generating device 101. Inserting the distal end of the aerosol-generating device 101 into the cavity 104 aligns the face 46 of the first connector part 40 with the face 56 of the second connector part 50. Aligning the faces 46 and 56 of the first and second connector parts 40, 50 also aligns the recess 48 and the projection 58, the first electrical contacts 43, 53, the second electrical contacts 44, 54 and the third electrical contacts 45, 55 of the first and second connector parts 40, 50, respectively. Accordingly, when the first connector part 40 is brought into contact with the second connector part 50, the projection 58 is received in the recess 48, the first electrical contacts 43, 53 are electrically engaged, the second electrical contacts 44, 54 are electrically engaged and the third electrical contacts 45, 55 are electrically engaged.

Figure 14:
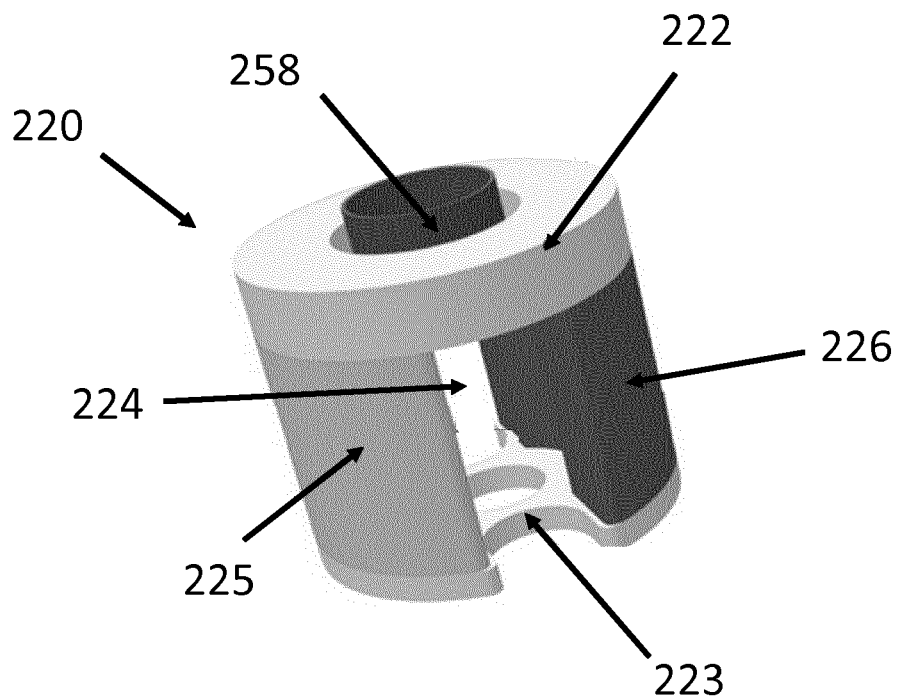
FIG. 14 shows a perspective schematic illustration of a magnetic retention structure compatible with the second connector part of the electrical connector of the third embodiment of the present invention.
Figure 15:
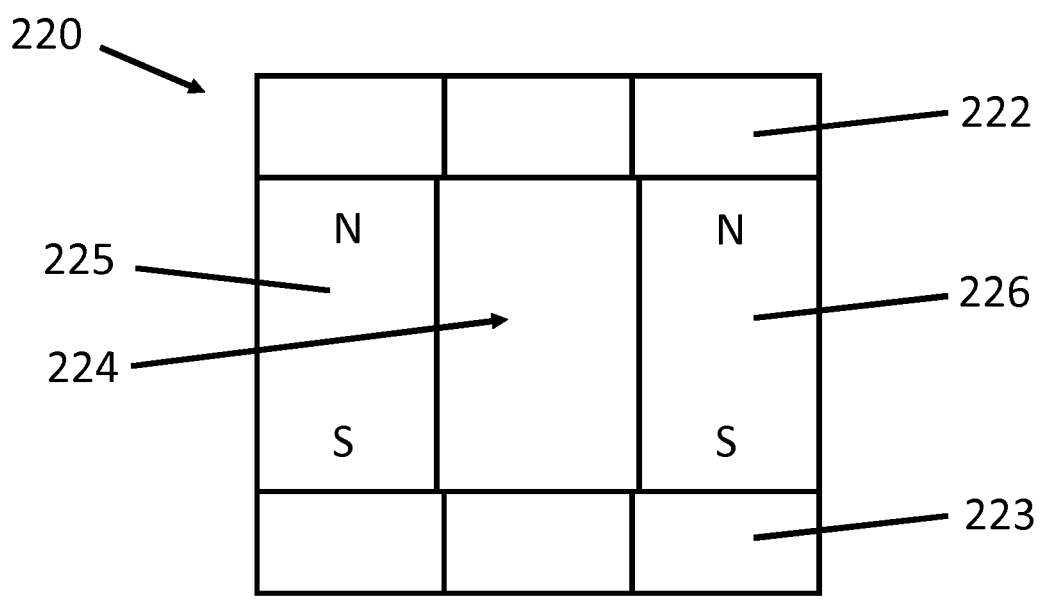
FIG. 15 shows a cross-section of the magnetic retention structure of FIG. 14.
Figure 16:
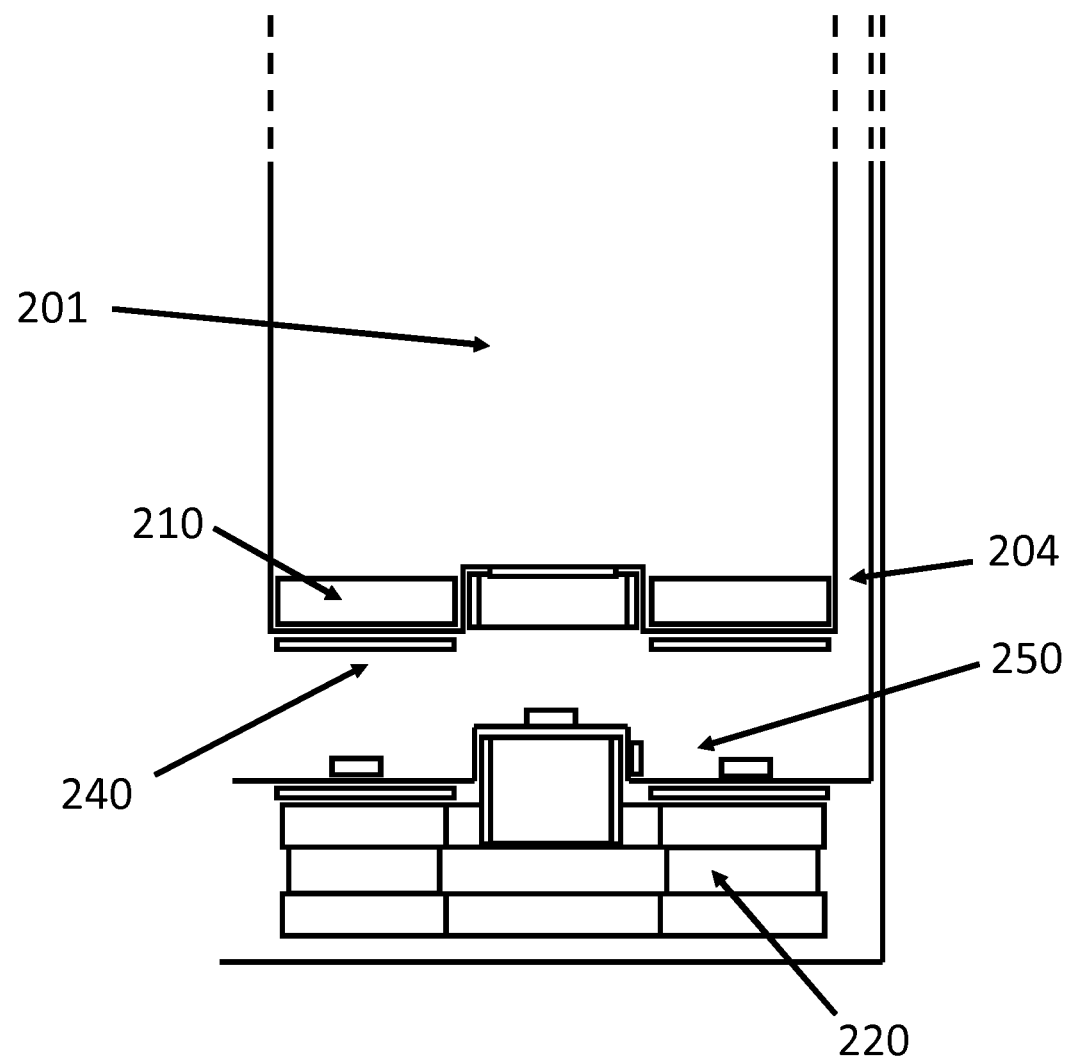
FIG. 16 shows an electrically operated aerosol-generating system comprising the electrical connector according to the third aspect of the present invention and the magnetic retention means of FIGS. 14 and 15.

FIGS. 14, 15 and 16 show an embodiment of magnetic retention means for releasably retaining electrical engagement between first and second connector parts of an aerosol-generating system of the present invention, when an aerosol-generating device 201 of the system is received in a cavity 204 of a charging unit of the system. The magnetic retention means comprises a first magnetic material 210 at the distal end of the aerosol-generating device 201 and a second magnetic material at a closed end of the cavity 204.

The aerosol-generating device 201 comprises a first connector part 240 at a distal end face. In this embodiment, the first magnetic material 210 does not form the third electrical contact of the first connector part 240'. The first magnetic material 210 comprises a ring of ferromagnetic material arranged proximally of the first connector part 250 in the device 201. The ring substantially circumscribes the recess 258 of the first connector part 250 and is electrically isolated from the first connector part 240.

The cavity 204 of the charging unit comprises a second connector part 250 at a closed end face. The second magnetic material 220 comprises a substantially tubular magnetic structure, shown in detail in FIGS. 14 and 15. The second magnetic material 220 is arranged beneath the second connector part 250 and is electrically isolated from the second connector part 250.

FIGS. 14 and 15 show schematic illustrations of the second magnetic material 220. The second magnetic material 220 generally comprises two rings 222, 223 of ferromagnetic material that are aligned such that an unobstructed cylindrical passage 204 is provided through the rings 222, 223. The rings 222, 223 are spaced apart along the axis of the cylindrical passage, and are separated by two permanent magnets 225, 226. The two permanent magnets 225, 226 are substantially identical and each magnet comprises a substantially semi-circular arc having a radius substantially equal to the radius of the rings 222, 223. The permanent magnets 225, 226 are arranged to generally circumscribe the cylindrical passage 224, on opposite sides of the central passage. The magnetic north-south polarities of the permanent magnets 225, 226 are oriented in the same direction, as illustrated in FIG. 15 by the letters 'N' and 'S'. Each magnet 225, 226 has opposing arcuate surfaces, which may be referred to here as an upper surface and a lower surface. Each magnet 225, 226 has a single magnetic north pole at one of the arcuate surfaces and a single magnetic south pole at the opposite arcuate surface. The magnetic north poles of the magnets 225, 226 are arranged at the arcuate upper surfaces, adjacent to the top ring 222 and the magnetic south poles are arranged at the arcuate lower surfaces, adjacent to the bottom ring 223. In this arrangement, the second magnetic material 220 forms a generally tubular permanent magnet.

The second magnetic material 220 is arranged in the charging unit below the second connector part 250 at the closed end of the cavity 204. The central passage 223 through the second magnetic material 220 is aligned with the projection 258 of the second connector part 250, and enables electrical connectors to connect the first and second electrical contacts of the second connector part 250, which are arranged on the projection 258, to the electrical circuitry of the charging unit.

The magnetic north-south polarity of the second magnetic material 220 is generally aligned with the longitudinal axis of the cavity 204. When the first connector part 240 is moved into the cavity and into close proximity to the second connector part 250, the second magnetic material 220 magnetises the first magnetic material 210 in the aerosol-generating device, and the magnetic attraction between the first magnetic material 210 and the second magnetic material 220 draws the aerosol-generating device along the longitudinal axis of the cavity 204 towards the second connector part 250 and the second magnetic material 220 at the closed end. This action facilitates electrical connection of the first and second connector parts 240, 250.

When the first and second connector parts 240, 250 are electrically engaged, the magnetic attraction between the first and second magnetic materials 210, 220 releasably retains the first and second connector parts 240, 250 together, in electrical engagement. In other words, the magnetic attraction between the first and second magnetic materials resists separation of the first and second connector parts 240, 250 in the direction of the longitudinal axis of the cavity 204. As such, additional force is required to disengage the first and second connector parts 240, 250.

Figure 17:
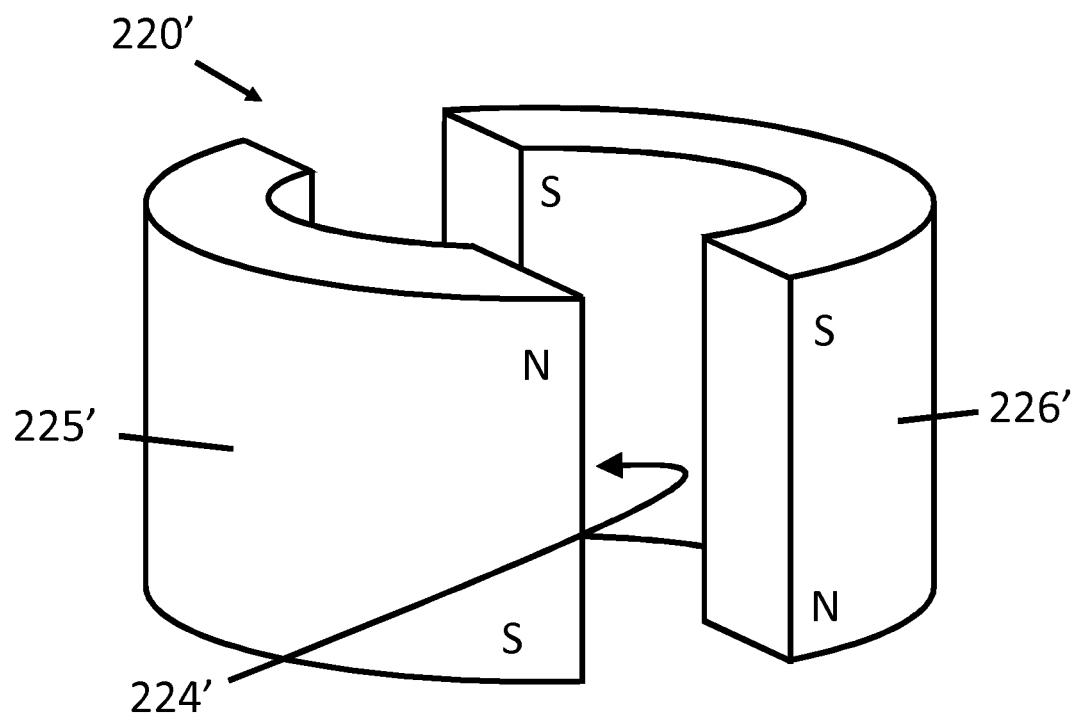
FIG. 17 shows a perspective view of another embodiment of a magnetic retention structure compatible with the second connector part of the electrical connector of the third embodiment of the present invention.
Figure 18:
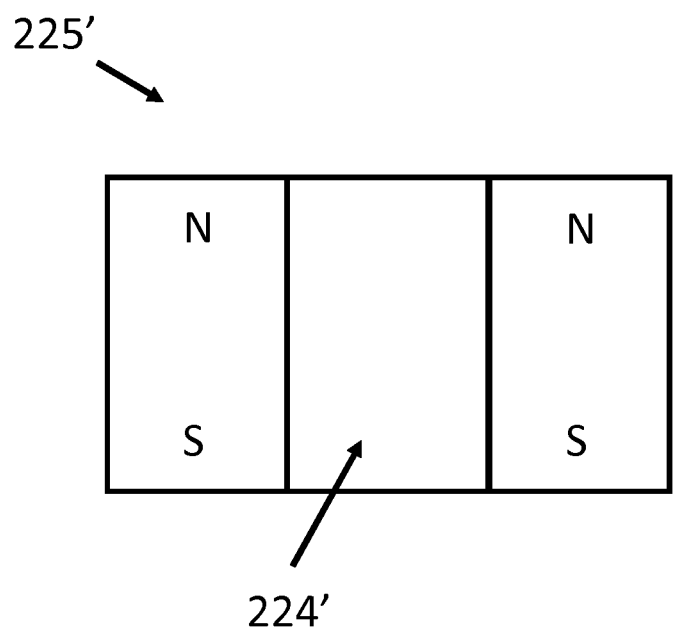
FIG. 18 shows a front view of one of the magnets of the arrangement of FIG. 17.
Figure 19:
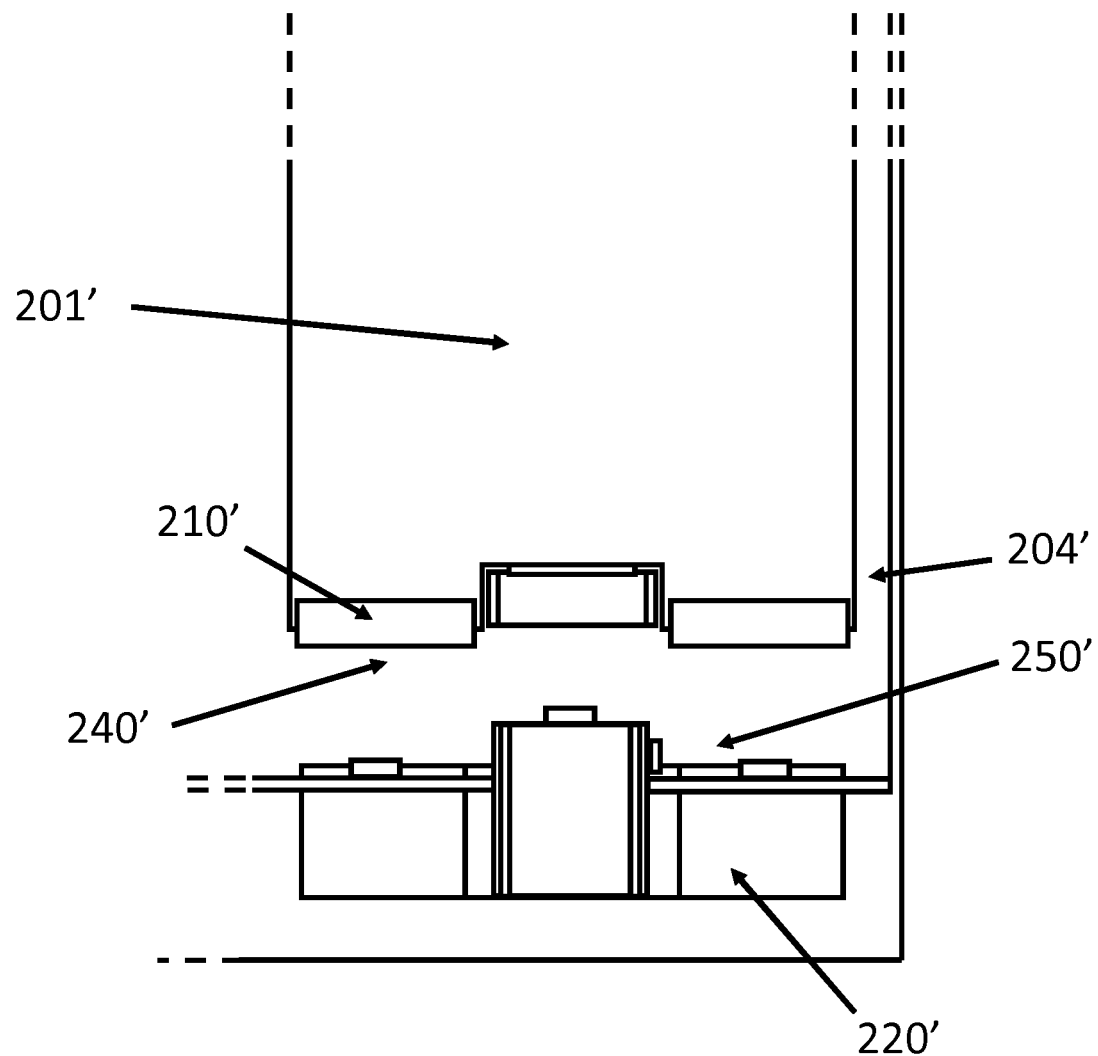
FIG. 19 shows an electrically operated aerosol-generating system comprising the electrical connector according to the third aspect of the present invention and the magnetic retention means of FIGS. 16 and 17.

FIGS. 17, 18 and 19 show another embodiment of magnetic retention means for releasably retaining electrical engagement between first and second connector parts 240', 250' of an aerosol-generating system of the present invention, when an aerosol-generating device 201' of the system is received in a cavity 204' of a charging unit of the system. The magnetic retention means comprises a first magnetic material 210' at the distal end of the aerosol-generating device 201' and a second magnetic material 220' at a closed end of the cavity 204'.

The aerosol-generating device 201' comprises a first connector part 240' at a distal end face. In this embodiment, the third electrical contact of the first connector part 240' comprises the first magnetic material 210', and as such, the first magnetic material 210' comprises a ring of ferromagnetic material which circumscribes the recess of the first connector part 240'.

The cavity 204' of the charging unit comprises a second connector part 250' at a closed end face of the cavity. The second magnetic material 220' comprises two arcuate permanent magnets 225', 226', shown in FIGS. 17 and 18. The two permanent magnets 225', 226' are substantially arcuate and have the same curvature as the third electrical contact of the first connector part 210'. The permanent magnets 225' and 226' are arranged on opposite sides of the second connector part 250' and are electrically isolated from the second connector part 250'. The permanent magnets 225', 226' are arranged to curve laterally around the cylindrical passage 224' and generally circumscribe the cylindrical passage 224', on opposite sides. The permanent magnets 225', 226'; are also spaced apart laterally such that the magnets 225' 226' are arranged on opposite sides of the third electrical contacts of the second connector part 250', with the third electrical contacts disposed between them.

As shown in FIG. 19, the permanent magnets 225', 226' extend above the surface of the second connector part 250'. An arcuate upper surface of the permanent magnets 225', 226' is arranged to a position just below the top of the third electrical contacts pogo pins, when the pogo pin contacts are in their compressed position. In this arrangement, the first magnetic material 210' of the device 201' is arranged adjacent to the second magnetic material 220' of the cavity 204' of the charging unit, when the device 201' is arranged in the cavity 204' and the first connector part 240' is in contact with the second connector part 250'.

Each magnet 225', 226' has a single magnetic north pole at one of the arcuate surfaces and a single magnetic south pole at the opposite arcuate surface. As such, when each magnet is viewed from the front, looking at the end surfaces of the arcuate magnet, both ends of the magnet have a magnetic north-south polarity oriented in the same direction, as shown in FIG. 18 for magnet 225'.

The magnetic north-south polarities of the permanent magnets 225', 226' are oriented in opposite directions, as illustrated in FIG. 17 by the letters 'N' and 'S'. The magnetic north pole of the magnet 225' and the magnetic south pole of the magnet 226' are arranged to extend out from the surface of the second connector part 250'. In this arrangement, the magnetic north pole of the magnet 225' and the magnetic south pole of the magnet 226' are arranged adjacent to the first magnetic material 210' when the device 201' is arranged in the cavity 204' and the first and second connector parts 240', 250' are engaged. In this arrangement, the permanent magnet 225', the first magnetic material 210' and the permanent magnet 226' form a magnetic circuit.

The magnetic attraction between the first magnetic material 210' and the second magnetic material 220' draws the aerosol-generating device along the longitudinal axis of the cavity 204' towards the second connector part 250' and the second magnetic material 220' at the closed end. This action facilitates electrical connection of the first and second connector parts 240', 250', as described for the previous embodiment.

Figure 20:
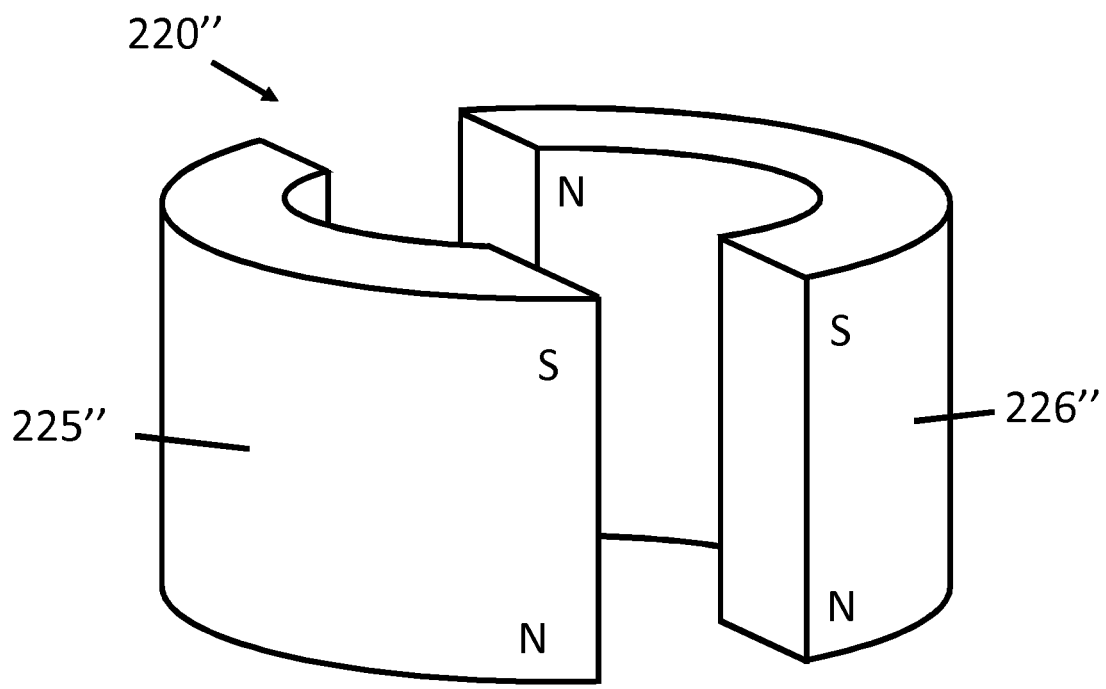
FIG. 20 shows a perspective view of another embodiment of a magnetic retention structure compatible with the second connector part of the electrical connector of the third embodiment of the present invention.
Figure 21:
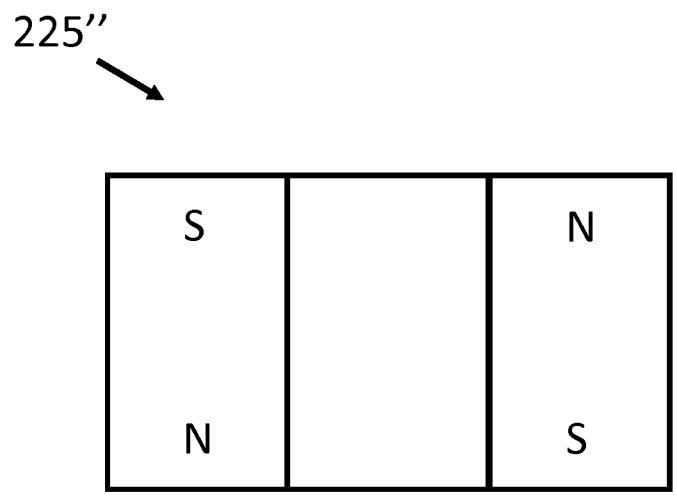
FIG. 21 shows a front view of one of the magnets of the arrangement of FIG. 120.

FIGS. 20 and 21 show an alternative embodiment for the second magnetic material of the magnetic retention means of FIGS. 17, 18 and 19 described above. The second magnetic material 220" of the embodiment shown in FIGS. 20 and 21 comprises two arcuate permanent magnets 225", 226", which are substantially identical to the permanent magnets 225', 226' of FIGS. 17 and 18. The permanent magnets 225", 226" differ from the magnets 225', 226' in the arrangement of the magnetic north-south polarity.

Each arcuate surface of each of the magnet 225", 226" has a magnetic north pole and a magnetic south pole. For each magnet 225", 226" the magnetic north pole of one of the arcuate surfaces is arranged at the opposite end of the arcuate surface to the magnetic pole of the opposite arcuate surface. Similarly, The magnetic south pole of one arcuate surface is arranged at the opposite end of the arcuate surface to the other arcuate surface. In this arrangement, when viewing each magnet from the front and looking at both end surfaces of the arcuate magnet, the end surfaces have magnetic north-south polarities oriented in opposite directions, as shown in FIG. 21 for magnet 225". In other words, the magnetic north poles are arranged at diagonally opposite corners of the magnet and the magnetic south poles are arranged at diagonally opposite corners of the magnet.

The permanent magnets 225", 226" are arranged around the second connector part (not shown) in a similar manner to the magnets 225', 226' described above for the embodiment shown in FIG. 18. When the magnets 225", 226" are arranged around the second connector part, the magnetic north poles of the magnet 225" are arranged adjacent to the magnetic north poles of the second magnet 226" and the magnetic south poles of the magnet 225" are arranged adjacent to the magnetic south poles of the magnet 226", as shown in FIG. 20. In this arrangement, when the first magnetic material is arranged adjacent to the arcuate upper surfaces of the magnets 225", 226", the magnets 225", 226" and the first magnetic material form an alternative magnetic circuit to the circuit describe above in relation to the embodiment of FIGS. 17, 18 and 19.

It will be appreciated that in other embodiments, the permanent magnets of the second magnetic material may have a magnetic north-south polarity oriented in the opposite direction. It will be appreciated that in embodiments comprising a second magnetic material comprising more than one permanent magnet, the magnetic north-south polarities of the magnets may be oriented in alternative arrangements. It will also be appreciated that in other embodiments the first magnetic material of the aerosol-generating device may comprise one or more permanent magnets.

It will be appreciated that features described in relation to one embodiment or aspect of the present invention may be applied to other embodiments or aspects of the present invention.

The invention claimed is:

1. An electrically operated aerosol-generating system, comprising:

an aerosol-generating device;

a charging unit configured to receive the aerosol-generating device; and a first connector part and a second connector part, the aerosol-generating device having one of the first connector part and the second connector part and the charging unit having the other one of the first connector part and the second connector part, wherein:

the first connector part comprises a face of the first connector part and a recess arranged substantially centrally in the face of the first connector part, the recess having a closed end, an open end at the face of the first connector part, and a sidewall extending between the open end and the closed end, a first electrical contact of the first connector part, arranged at the closed end of the recess, a second electrical contact of the first connector part, arranged at the sidewall of the recess and substantially circumscribing the first electrical contact of the first connector part, and a third electrical contact of the first connector part, arranged at the face and substantially circumscribing the first electrical contact of the first connector part, the second connector part comprises:

a first electrical contact of the second connector part, a second electrical contact of the second connector part, spaced radially outwardly from the first electrical contact of the second connector part, and a third electrical contact of the second connector part, spaced radially outwardly from the first electrical contact of the second connector part, the first and the second connector parts are arranged such that when the aerosol-generating device is received by the charging unit the first and the second connector parts electrically engage, and the electrical contacts of the first and second connector parts are arranged such that when the first and second connector parts electrically engage:

the first electrical contact of the first connector part electrically engages the first electrical contact of the second connector part, the second electrical contact of the first connector part electrically engages one of the second electrical contact of the second connector part and the third electrical contact of the second connector part, and the third electrical contact of the first connector part electrically engages the other one of the second electrical contact of the second connector part and the third electrical contact of the second connector part, regardless of an angular position of the second connector part relative to the first connector part.

2. The electrically operated aerosol-generating system according to claim 1, wherein:

the second connector part comprises a face of the second connector part and a projection arranged substantially centrally in the face of the second connector part, the projection being receivable in the recess of the first connector part and having an end face and at least one sidewall extending between the face of the second connector part and the end face of the projection, the first electrical contact of the second connector part is arranged at the end face of the projection, the second electrical contact of the second connector part is arranged at the at least one sidewall of the projection, and the third electrical contact of the second connector part is arranged at the face of the second connector part.

3. The electrically operated aerosol-generating system according to claim 1,
wherein the electrically operated aerosol-generating device comprises a rechargeable electrical power supply, and
wherein the charging unit comprises another rechargeable electrical power supply.

4. The electrically operated aerosol-generating system according to claim 3,
wherein at least one of the electrical contacts of each of the first and the second connector parts is configured to transfer power from the power supply of the charging unit to the power supply of the aerosol-generating device, and
wherein at least one of the other electrical contacts of each of the first and the second connector parts is configured to transfer data from at least one of the charging unit to the aerosol-generating device and the aerosol-generating device to the charging unit.

5. The electrically operated aerosol-generating system according to claim 1,
wherein the aerosol-generating device comprises a proximal end and a distal end, and
wherein the charging unit comprises a cavity configured to receive at least the distal end of the aerosol-generating device, the cavity having an open end of the cavity and a closed end of the cavity.

6. The electrically operated aerosol-generating system according to claim 5,
wherein one of the first and the second connector parts is arranged at an end face at the distal end of the aerosol-generating device, and
wherein the other one of the first and the second connector parts is arranged at another end face at the closed end of the cavity of the charging unit.

7. The electrically operated aerosol-generating system according to claim 1,
wherein the first electrical contact of the first connector part substantially extends in a first plane,
wherein the third electrical contact of the first connector part substantially extends in a third plane, parallel to the first plane, and
wherein the second electrical contact of the first connector part substantially extends in a third plane perpendicular to the first and the second planes.

8. The electrically operated aerosol-generating system according to claim 1, wherein one or more of the electrical contacts of the second connector part are pin contacts.

9. The electrically operated aerosol-generating system according to claim 1, further comprising retention means for releasably retaining electrical engagement of the first connector part and the second connector part when the aerosol-generating device is received by the charging unit.

10. The electrically operated aerosol-generating system according to claim 9,
wherein the retention means comprises a first magnetic material provided on the aerosol-generating device and a second magnetic material provided on the charging unit, and
wherein the first and the second magnetic materials are arranged such that the first and the second magnetic materials are proximate to each other when the aerosol-generating device is received by the charging unit so that the retention means releasably retains the engagement of the first and the second connector parts.

11. The electrically operated aerosol-generating system according to claim 10,
wherein the first magnetic material is arranged proximate the one of the first and the second connector parts of the aerosol-generating device, and
wherein the second magnetic material is arranged proximate the other one of the first and the second connector parts of the charging unit.

12. An electrically operated aerosol-generating device comprising an electrical connector part, the electrical connector part comprising:
a face and a recess arranged substantially centrally in the face, the recess having a closed end, an open end at the face, and a sidewall extending between the open end and the closed end;
a first electrical contact arranged at the closed end of the recess;
a second electrical contact arranged at the sidewall of the recess and substantially circumscribing the first electrical contact; and
a third electrical contact arranged at the face and substantially circumscribing the first electrical contact.

13. The electrically operated aerosol-generating device according to claim 12, further comprising:
a cavity configured to receive an aerosol-forming substrate;
an electric heater configured to heat an aerosol-forming substrate received in the cavity;
a rechargeable power supply configured to supply power to the electric heater; and
electric circuitry configured to control the supply of power to the electric heater from the power supply and being electrically connected to the electrical connector part for transfer of at least one of power and data through the electrical connector part.

14. The electrically operated aerosol-generating device according to claim 13, wherein the electrical connector part is arranged at an end face of the aerosol-generating device.

15. A charging unit, comprising:
a housing having a cavity configured to receive an electrically operated aerosol-generating device; and
an electrical connector part configured to electrically connect to the electrically operated aerosol-generating device when the device is received in the cavity, the electrical connector part comprising:
a face and a projection arranged substantially centrally in the face, the projection having an end face and a sidewall extending between the face and the end face of the projection,
a first electrical contact arranged at the end face of the projection,
a second electrical contact arranged at the sidewall of the projection and spaced radially outwardly from the first electrical contact, and
a third electrical contact arranged at the face spaced radially outwardly from the first electrical contact.

* * * * *